(12) United States Patent
Genkawa

(10) Patent No.: US 7,642,736 B2
(45) Date of Patent: Jan. 5, 2010

(54) DEVICE AND METHOD FOR CONTROLLING CHANGING OPERATION OF ON-LOAD TAP CHANGER

(75) Inventor: Hitoshi Genkawa, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 122 days.

(21) Appl. No.: 11/711,770

(22) Filed: Feb. 28, 2007

(65) Prior Publication Data

US 2008/0074073 A1   Mar. 27, 2008

(30) Foreign Application Priority Data

Sep. 27, 2006   (JP)   ............... 2006-262440

(51) Int. Cl.
*B60K 6/36* (2007.10)
(52) U.S. Cl. ............... 318/9; 318/3; 318/255; 318/256; 200/11 TC
(58) Field of Classification Search ......... 318/779, 318/255, 265, 9, 3; 200/11 TC, 17 R; 361/79
See application file for complete search history.

(56) References Cited

U.S. PATENT DOCUMENTS

| 5,097,194 A * | 3/1992 | Walton et al. ............... 320/128 |
| 5,693,922 A * | 12/1997 | Tuohy et al. ............... 200/17 R |
| 6,172,863 B1 * | 1/2001 | Ito et al. ...................... 361/79 |
| 6,559,619 B1 * | 5/2003 | Bach ........................... 318/729 |
| 6,995,481 B2 * | 2/2006 | Gibson ......................... 307/96 |
| 2006/0097703 A1 * | 5/2006 | Suzuki et al. ................. 322/20 |
| 2007/0057651 A1 * | 3/2007 | Hoffman ...................... 323/258 |

FOREIGN PATENT DOCUMENTS

| JP | 60025209 | 2/1985 |
| JP | 6-37908 U | 5/1994 |
| JP | 2000223331 | 8/2000 |
| JP | 2004235587 | 8/2004 |
| JP | 2005012954 | 1/2005 |

* cited by examiner

*Primary Examiner*—Bentsu Ro
*Assistant Examiner*—David S Luo
(74) *Attorney, Agent, or Firm*—Buchanan Ingersoll & Rooney PC

(57) ABSTRACT

A device and method for controlling the changing operation of an on-load tap changer (LTC) that interrupts current passing the current zero point of a commercial frequency are provided. The device may include a current zero point detecting unit that detects a zero point in the waveform of current passed through the LTC, a current zero point cycle measuring unit that measures the cycle of the current zero point detected by the current zero point detecting unit, a commercial frequency determining unit that generates an output signal when the cycle of the current zero point measured by the current zero point cycle measuring unit corresponds to a commercial frequency, and an actuation signal output unit that outputs an actuation signal used to have the LTC carry out tap changing operation in response to the output signal of the commercial frequency cycle determining unit.

4 Claims, 22 Drawing Sheets t 1 ( ONE TAP DIFFERENTIAL VOLTAGE GENERATION POINT )

t 1 ( ONE TAP DIFFERENTIAL VOLTAGE GENERATION POINT )

t 1 ( ONE TAP DIFFERENTIAL VOLTAGE GENERATION POINT )

DEVICE AND METHOD FOR CONTROLLING CHANGING OPERATION OF ON-LOAD TAP CHANGER

BACKGROUND OF THE INVENTION

1. Field of the Invention

The present invention relates to a device and method for controlling the changing operation of an on-load tap changer that changes the tap of a transformer.

2. Description of the Related Art

It has been well known that the on-load tap changer changes the tap of a transformer in a load operation state to change and adjust the turn ratio of secondary winding/primary winding of the transformer, in other words, changes and adjusts the transformation ratio.

The on-load tap changer is driven by a motor operation mechanism to operate. The mechanism responds to a remote actuation command from an automatic voltage regulating relay (normally provided in the main control room) that continuously monitors the voltage state of the load of the transformer or from an operator who monitors the operation state in the main control room. The mechanism then operates the on-load tap changer to regulate voltage at the secondary side of the transformer for a dropped amount in the secondary voltage if for example the voltage of the load connected to the secondary side of the transformer drops.

The operation of the on-load tap changer necessitates bridging between taps during the changing operation, and a current limiting resistor is employed in a circuit to limit the bridging current between the taps during the bridging operation. This type of device is called "resistor type on-load tap changer."

According to conventional techniques, the current interruption with the resistor type on-load tap changer is normally successful during one-tap changing operation if the following conditions are satisfied. These ideas have been adopted as a Japanese standard for on-load tap changers (on-load tap changer JEC2220) and an international standard (IEC-214), and performance testing methods, assessments and the like have been established.

1) Interrupting current for use is at a commercial frequency of 50 Hz or 60 Hz.

2) Current is interrupted at a current zero point.

If tap changing operation is carried out in the above described conditions, the on-load tap changer can normally interrupt current and successfully make a connection to a target tap.

A conventional on-load tap changer therefore regulates voltage to a prescribed level at the load side of a transformer provided that the current interruption conditions in the above 1) and 2) are satisfied. Therefore, the changing operation is carried out in response to an actuation command from the automatic voltage regulating relay or the operator as described above without monitoring for the presence/absence of a current zero point in the waveform of current actually passing through the on-load tap changer or measuring the cycle of the current zero point.

However, if the load connected to the transformer is special, for example if power is supplied to a load such as an AC electric railcar or a flicker, or if a plurality of on-load tap changing transformers are operated in parallel, the following disadvantage is encountered.

For a special load, for example, the supplied current may become current with a distorted waveform including a harmonic component and may not pass a current zero point at predetermined intervals unlike a normal commercial frequency.

If the on-load tap changer is operated by current with such a distorted waveform because of the special load, the interrupting current does not pass a current zero point in the cycle of a commercial frequency. If the cycle is prolonged in particular, the duration of arc discharge from the opening to the extinction of the arc is prolonged, so that the arc discharge could continue for not less than 10 ms that is the period tolerated for arc generation that can normally be interrupted, in other words, the arc cannot be extinguished within a normal changing period. At worst, if the arc cannot be extinguished before the main contact is closed on the next tap side, the arc current is passed, which could give rise to a serious accident such as short-circuiting between the taps.

When a plurality of on-load tap changing transformers are provided and operated in parallel with a normal load (operating at a commercial frequency) and power is supplied to the load, even slight time difference in changing operation between the on-load tap changers can generate one tap differential voltage at the parallel arrangement of transformers, and circulating current superposed with DC current is passed between the transformers arranged in parallel because of the tap differential voltage.

The on-load tap changers are adjusted by driving shafts that couple the motor operation mechanisms that drive the on-load tap changers to the on-load tap changers so that the on-load tap chargers operate in timing as similar as possible in order to reduce the time to pass of the circulating current as much as possible and the temperature rise of the transformers caused by the circulating current as much as possible.

However, it would be difficult to adjust the plurality of tap changers to be in the same timing for structural reasons, and very small time difference for changing operation is tolerated.

Therefore, the circulating current caused by the slight operation timing difference is superposed to diverted load current to each of the transformers and the resulting current is passed to each of the on-load tap changers. The superposed current includes a DC component as disclosed by JP-A-2005-12954 and therefore is transient current that does not pass a current zero point. If one preceding on-load tap changer operates and then a succeeding on-load tap changer operates to interrupt current with slight time difference from the operation of the preceding on-load tap changer during the period before the DC component is attenuated to the level of normal current that passes a current zero point, the current interruption may depart from the current interruption conditions, and the current may not be interrupted normally by the main contact on the interrupting side, which could cause current to be passed with continuous arc discharge for a significant time period. At worst, the current could continue to be passed before the main contact is closed on the next tap side, which could result in a serious accident such as short-circuiting between taps.

According to conventional techniques, however, no specific countermeasure has been suggested to prevent an on-load tap changer from interrupting current with a distorted waveform generated in an environment for a special consumer load (that generates the current waveform of a harmonic component) or current that does not pass a current zero point and is in a cycle other than that of a commercial frequency and no specific countermeasure has been suggested to prevent each on-load tap changer from interrupting transient current superposed with DC current caused by the operation timing difference between the on-load tap changers included in the transformers when the transformers are operated in parallel.

SUMMARY OF THE INVENTION

The present invention is directed to a solution to the above-described problems and it is an object of the invention to provide a device and method for controlling the changing operation of an on-load tap changer that interrupts current surely passing the current zero point of a commercial frequency and prevents a serious accident such as short-circuiting between taps caused by an interruption failure in any operation environment with any kinds of consumer loads and either in a signal or parallel arrangement.

A changing operation control device for an on-load tap changer according to the invention includes a current zero point detecting unit for detecting a zero point in the waveform of current passed through the on-load tap changer, a current zero point cycle measuring unit for measuring the cycle of the current zero point detected by the current zero point detecting unit, a commercial frequency cycle determining unit for transmitting an output signal if the cycle of the current zero point measured by the current zero point cycle measuring unit corresponds to a commercial frequency, and an actuation signal output unit for outputting an actuation signal used to have the on-load tap changer carry out tap changing operation in response to the output signal of the commercial frequency cycle determining unit.

According to the invention, in a changing operation control method for an on-load tap changer by carrying out the tap changing operation of on-load tap changers provided in a plurality of transformers operated in parallel and driven mechanically by motor operation mechanisms through coupling shafts in association with one another, the coupling positions of the motor operation mechanisms of the on-load tap changers and the coupling shafts are sequentially shifted so that the changing operation positions of the on-load tap changers are neither in coincidence nor in vicinity.

In the device and method for controlling the changing operation of an on-load tap changer according to the invention, arc generated by load current with a distorted waveform caused by supplying power to a special load can be prevented from being extinguished by the on-load tap changer, so that a short-circuiting accident at tap windings in the transformer derived from a failure in extinguishing the arc caused by the load current with a distorted waveform can be prevented and safe operation can be carried out in the electric power system.

When on-load tap changing transformers are operated in parallel, in operation control, arc caused by transient load current superposed with DC current caused by small operation time difference between the devices during the operation of the tap changers is not extinguished using the on-load tap changers. Therefore, a short-circuiting accident at tap windings in the transformer derived from a failure in extinguishing the arc caused by the load current superposed with DC current can be prevented and safe operation can be carried out in the electric power system.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
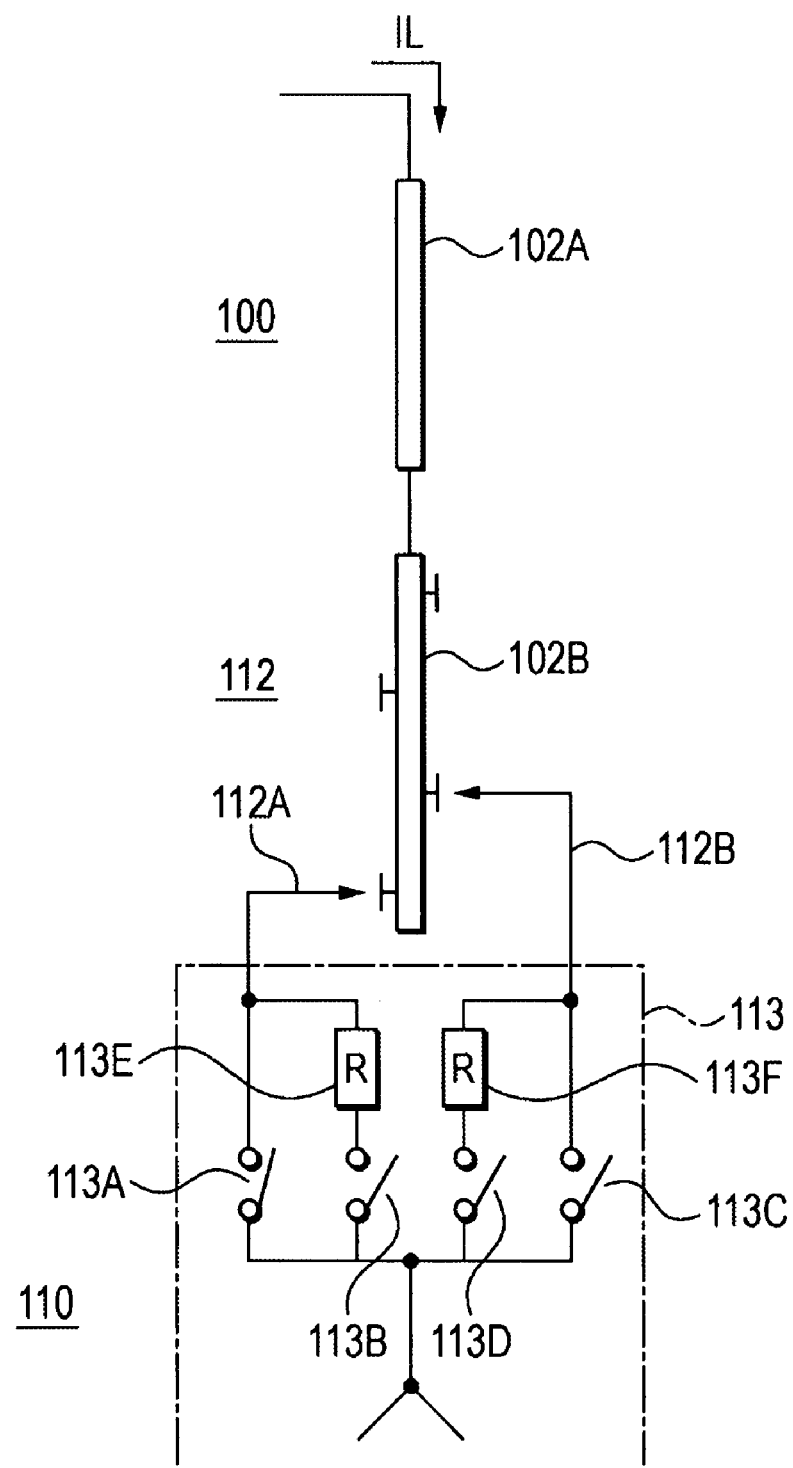
FIG. 1 is a connection diagram of a general example of a resistor type LTC.

FIG. 1 is a diagram of a general example of a resistor type on-load tap changer (hereinafter simply as "LTC"). FIG. 1 shows a one-phase part on the secondary side of a three-phase transformer in a star connection. The transformer 100 includes a secondary side main winding 102A, a secondary side tap winding 102B and an LTC 110 that carries out tap changing to the secondary side winding 102B.

The LTC 110 includes a tap selector 112 having an odd-number side tap selector 112A and an even-number side tap selector 112B and a diverter switch 113 connected to the tap selector.

The diverter switch 113 includes an odd-number side main contact 113A, an odd-number side resistor contact 113B, and an odd-number side current limiting resistor 113E connected to the odd-number side tap selector 112A, and an even-number side main contact 113C, an even-number side resistor contact 113D, and an even-number side current limiting resistor 113F connected to the even-number side tap selector 112B.

Figure 2A:
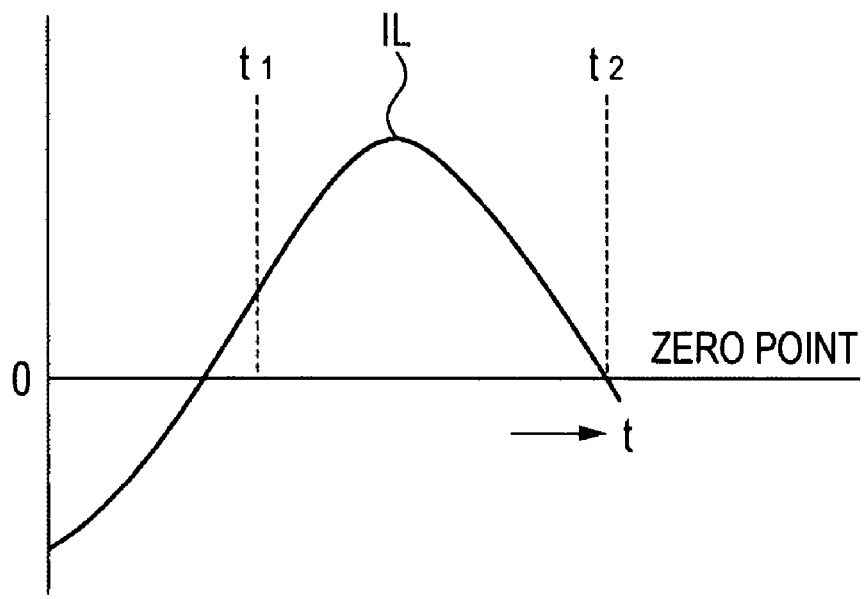
FIGS. 2A and 2B are waveform charts showing an example of the process of interrupting current in a resistor type LTC.
Figure 2B:
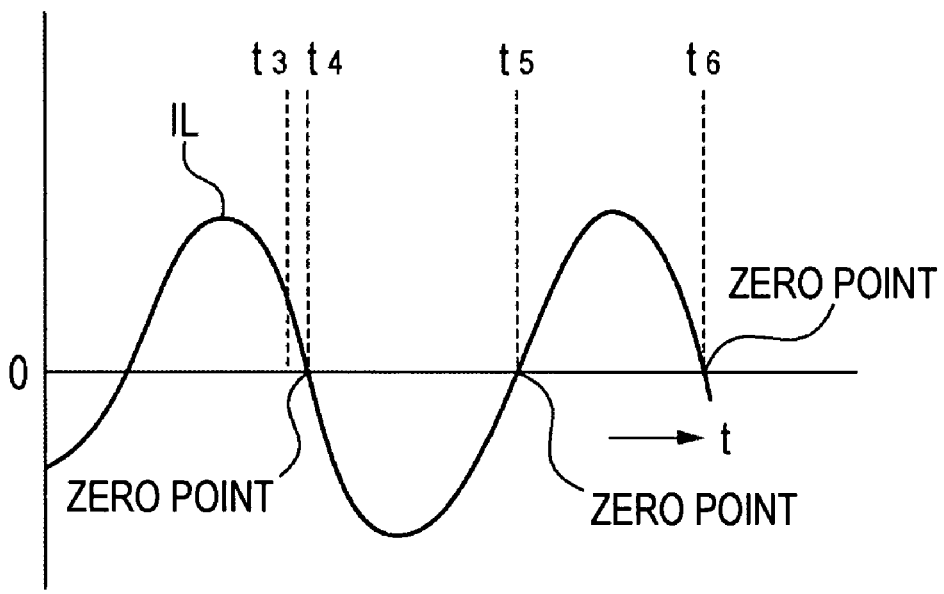

FIGS. 2A and 2B show an example of the process of how current is interrupted with the LTC. In FIG. 2A, when the odd-number side main contact 113A of the diverter switch 113 opens in the timing t1 of load current IL, arc is generated at the main contact 113A, the arc is cooled by a cooling medium in the vicinity of the contact such as oil and gas and the arc is successfully extinguished in the timing t2 in which the interrupting current passes a zero point, so that the load current IL is commuted to the odd-number side resistor contact 113B.

The current interruption or the arc extinguishing is successful only when a current zero point is passed in consideration of the characteristic of arc, and therefore if the contact is opened for example in the timing t3 of a certain current phase in FIG. 2B, arc discharge is generated and current is passed based on the arc until a zero point at t4 in the current waveform. If the arc is successfully extinguished at the zero point at t4, the interrupting current is commuted to the odd-number side resistor contact 113B already closed by mechanical operation. If the current is not successfully interrupted at the first current zero point at t4, the arc continues until the next current zero point at t5 to allow the current to be passed.

If the arc is not successfully extinguished at the current zero point at t5, the arc continues until the next current zero point at t6, and if the arc cannot be extinguished eventually until the even-number side main contact 113C is closed, the arc current is passed, which could give rise to a serious accident such as short-circuiting between the taps.

Figure 3:
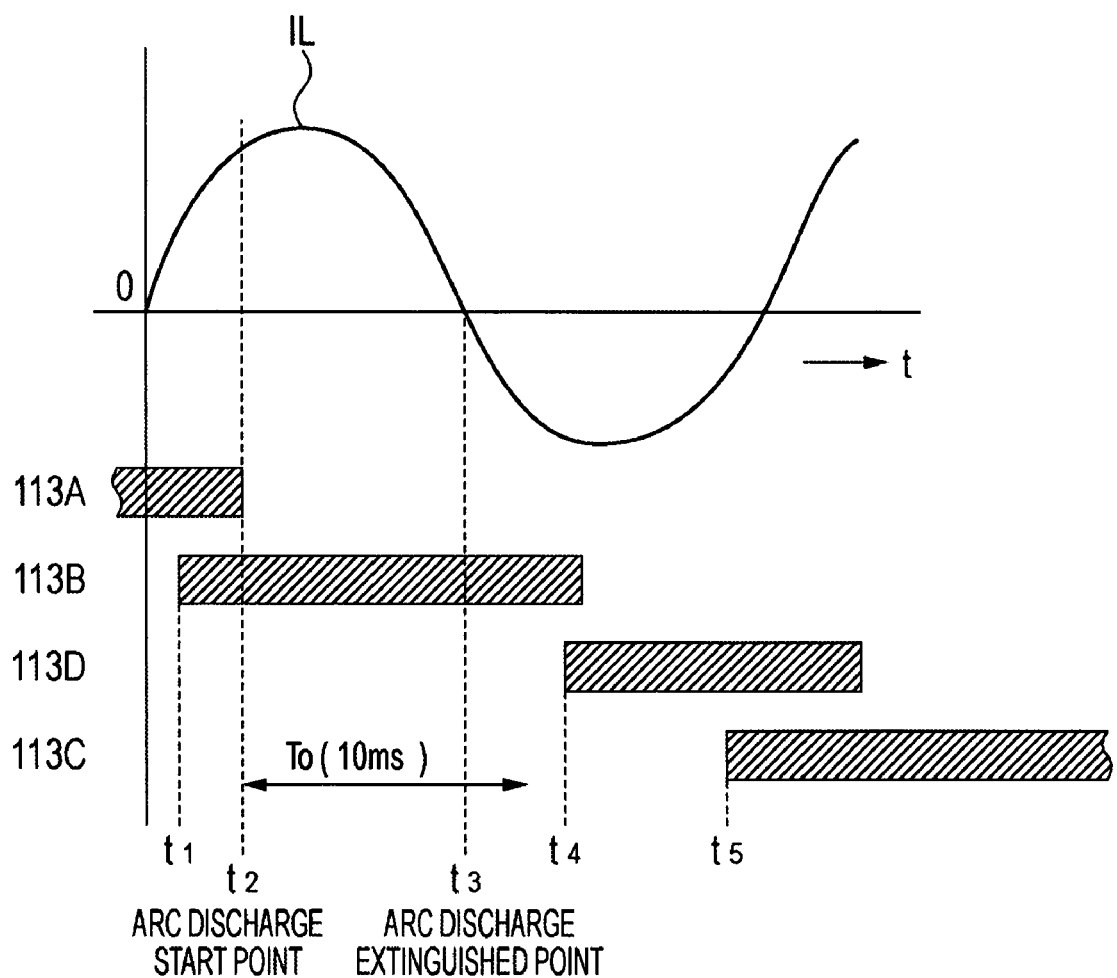
FIG. 3 is a chart for use in illustrating the changing sequence of diverter switches and the process of interrupting current in a resistor type LTC.

FIG. 3 shows an example of changing sequence from the odd-number side tap of the diverter switch 113 to the even-number side tap and the process of how the current is interrupted. In FIG. 3, t1 represents the closing point of the odd-number side resistor contact 113B, t2 represents the opening point of the odd-number side main contact 113A, t3 represent a current zero point, t4 represents the closing point of the even-number side resistor contact 113D, and t5 represents the closing point of the even-number side main contact 113C. Arc discharge is generated in the timing t2 in which the odd-number side main contact 113A is opened, the arc discharge continues until the current zero point t3, and the arc is extinguished in the timing of the current zero point t3.

The diverter switch 113 of the resistor type LTC 110 is generally designed and manufactured so that the current is interrupted and the arc extinguishing is completed at time T0 within 10 ms from the opening of the contact, and time T0 at least as long as 10 ms is secured as a mechanical operation period from the opening of the main contact such as the odd-number side main contact 113A to the closing of the next tap side resistor contact such as the even-number side resistor contact 113D. Therefore, when current at a commercial frequency is interrupted, the current can normally be interrupted before the other side resistor contact such as the even-number side resistor contact 113D is closed.

If however a special load is connected, the supply current has a distorted waveform including a harmonic component, and the current that does not pass a current zero point in a prescribed cycle unlike that of a normal commercial frequency. An example of the circuit diagram is shown in FIG. 4.

Figure 4:
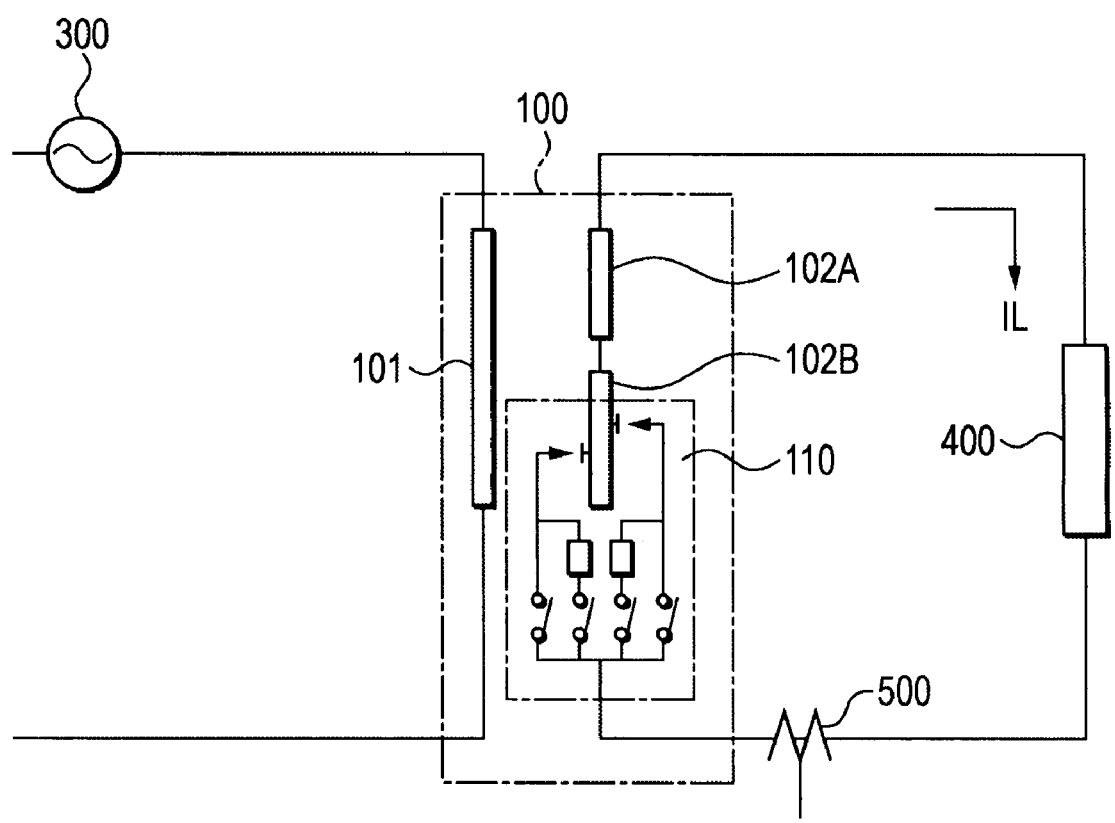
FIG. 4 is a circuit diagram of a single phase circuit of a transformer for a special load.
Figure 5:
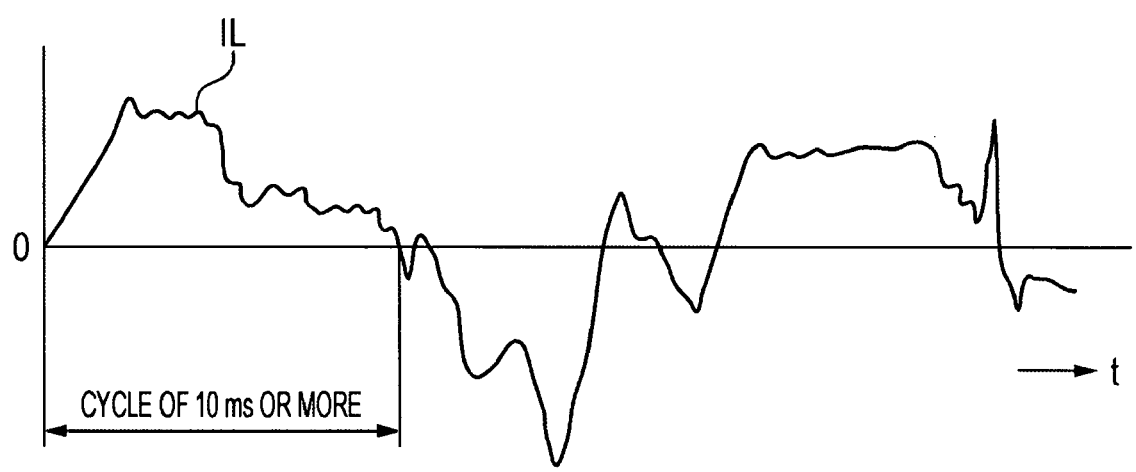
FIG. 5 is a waveform chart for use in illustrating the load current in FIG. 4.

In FIG. 4, 300 re-resents an AC power source, 100 represents an on-load tap changing transformer, 110 represents an LTC, 400 represents a consumer special load, 500 represents a current detector for measuring load current, IL represents load current whose waveform is shown in FIG. 5, 101 represents a primary side winding, 102A represents a secondary side main winding, and 102B represents a secondary side tap winding.

As described above, if the diverter switch for the LTC 110 is switched with special load current in a distorted waveform, the interrupting current does not pass a current zero point in the cycle of a commercial frequency as shown in FIG. 5. If the cycle is prolonged in particular, the duration of the arc discharge after the opening to the arc extinguishing is prolonged, the arc discharge could continue for not less than 10 ms that is the tolerated generation period of arc that can be normally interrupted and cannot be extinguished within the normal changing period. At worst, if the arc cannot be extinguished before the closing of the main contact on the next tap side, the arc current is passed, which could give rise to a serious accident such as short-circuiting between the taps.

Figure 6:
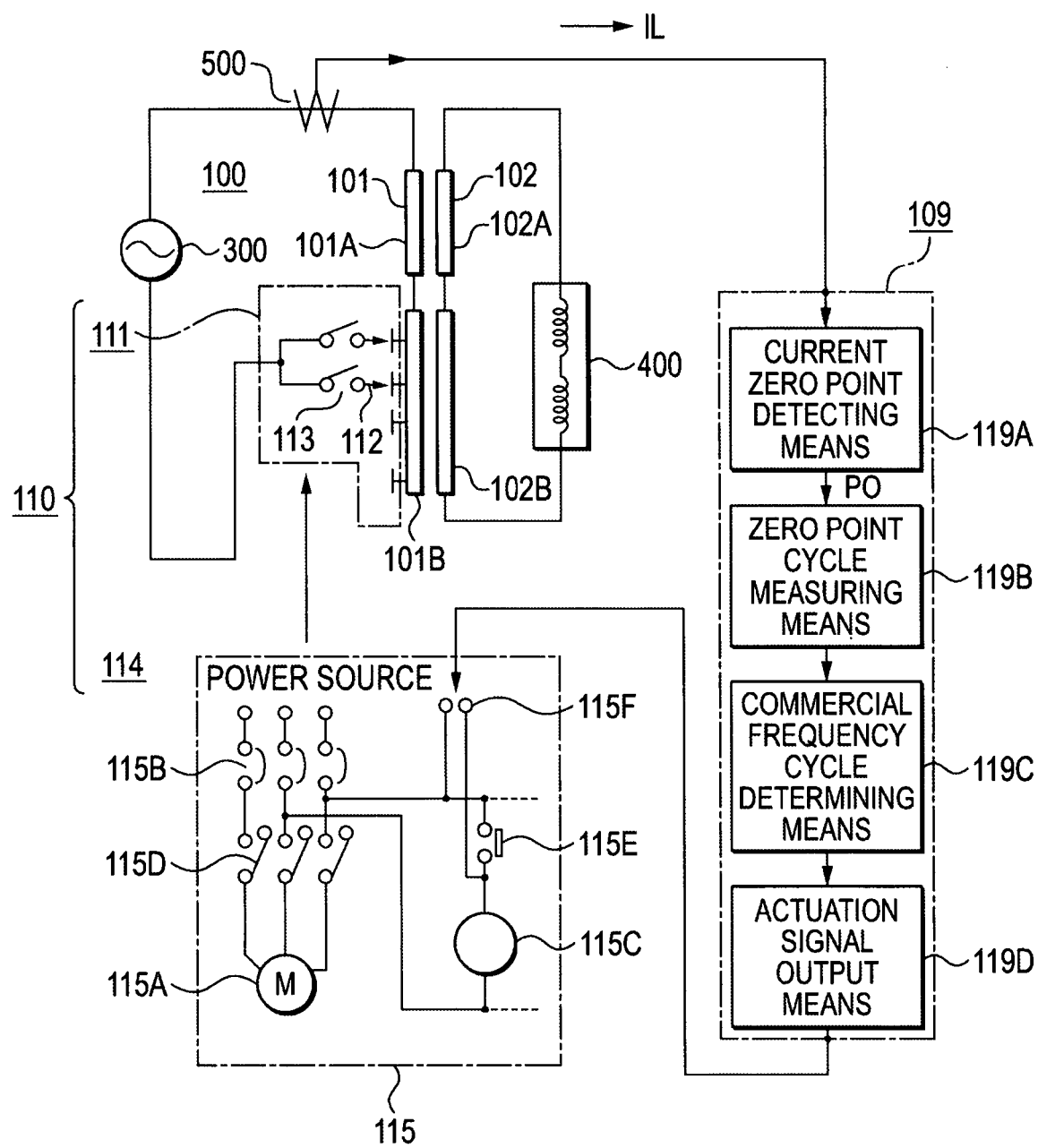
FIG. 6 is a diagram of a typical example of application of a changing operation controller for an LTC according to a first embodiment of the invention to a single-phase circuit.

FIG. 6 is a diagram of a typical example of application of a changing operation controller for an LTC according to a first embodiment of the invention directed to a solution to the problem to a single-phase circuit.

The transformer 100 including a resistor type LTC includes a primary side winding 101 including a primary side main winding 101A and a primary side tap winding 101B, and a secondary side winding 102 including a secondary side main winding 102A and a secondary side tap winding 102B, the primary side winding 101 is connected to an AC power source 300, and the secondary side winding 102 is connected to a load 400.

The LTC 110 that changes the primary side tap winding 101B of the transformer 100 includes an LTC main body 111, a driving motor operation mechanism 114, and a changing operation controller 119. (In FIG. 6, an example of the LTC that changes the secondary side tap winding 102B is not shown.) The LTC main body 111 includes a tap selector 112 and a diverter switch 113. The driving motor operation mechanism 114 includes a motor circuit 115, and the motor circuit 115 includes a motor 115A that drives the LTC main body 111, a breaker 115B for interrupting a power supply circuit, an electromagnetic contact device 115C that opens/closes the power supply circuit, a contact 115D of the electromagnetic contact device that serves as a contact thereof, a closing contact 115E that closes the electromagnetic contact device 115C, and an actuation signal input terminal 115F used to input an externally applied actuation signal.

The changing operation controller 119 includes a current zero point detecting unit 119A that detects a zero point in the current waveform of load current IL that passes through the LTC main body 111, a zero point cycle measuring unit 119B that measures the cycle of the current zero point detected by the current zero point detecting unit 119A, a commercial frequency cycle determining unit 119C that generates an output signal when the cycle of the current zero point measured by the current zero point cycle measuring unit 119B corresponds to a commercial frequency, and an actuation signal output unit 119D that outputs an actuation signal used to have the LTC 110 carry out tap changing operation in response to the output signal of the commercial frequency cycle determining unit 119C.

More specifically, the changing operation controller 119 detects a zero point in the current waveform detected by the primary side current detector 500 using the current zero point detecting unit 119A, the cycle of the current zero point is operated by the zero point cycle measuring unit 119B and the commercial frequency cycle determining unit 119C, and an actuation signal is transmitted from the actuation signal output unit 119D only if the operation result corresponds to a commercial frequency of 50 Hz or 60 Hz. In this way, the electromagnetic contact device 115C in the motor circuit 115 of the driving motor operation mechanism 114 is excited, the contact 115D of the electromagnetic contact device is closed, and the motor 115A is driven to carry out the changing operation of the LTC main body 111.

Figure 7:
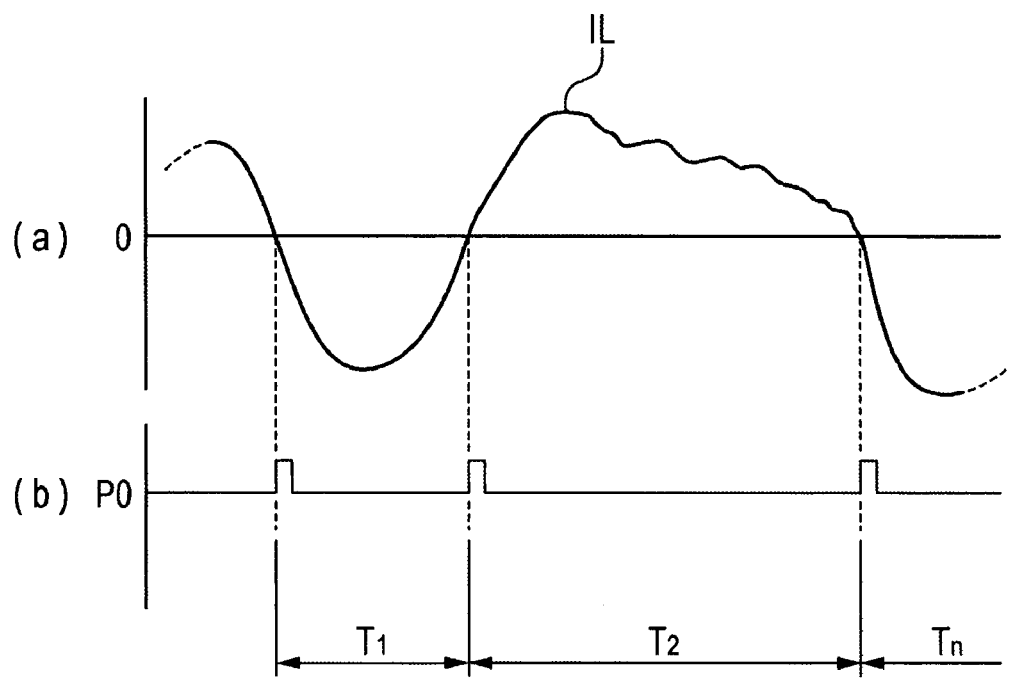
FIG. 7 is timing charts for use in illustrating the operation of the changing operation controller according to the first embodiment.

FIG. 7 is timing charts for use in illustrating the relation between the primary side load current IL and the output signal pulse P0 of the current zero point detecting unit 119A.

In FIG. 7, (a) shows the waveform of the primary side load current IL and (b) shows the output signal pulse P0 of the current zero point detecting unit 119A.

The current zero point detecting unit 119A detects the position of a current zero point of the primary side load current IL, the zero point cycle measuring unit 119B measures pulse waveform intervals (T1, T2, . . . , Tn) between the current zero points, and the commercial frequency cycle determining unit 119C determines whether the cycle is that of 50 Hz or 60 Hz.

The cycle of the zero point is 10 ms at 50 Hz and 8.33 ms at 60 Hz.

Note that the current zero point detecting unit 119A is a well-known dedicated circuit and the zero point cycle measuring unit 119B is for example the counter function of a programmable controller. The commercial frequency cycle determining unit 119C and the actuation signal output unit 119D are implemented for example by programs in the programmable controller.

The changing operation controller of the LTC according to the first embodiment described above includes a current zero point detecting unit that detects a zero point in the waveform of current passed through the LTC, a current zero point cycle measuring unit for measuring the cycle of the current zero point detected by the current zero point detecting unit, a commercial frequency cycle determining unit that generates an output signal only when the cycle of the current zero point measured by the current zero point cycle measuring unit corresponds to that of a commercial frequency, and an actuation signal output unit that outputs an actuation signal used to have the LTC carry out tap changing operation in response to the output signal of the commercial frequency cycle determining unit. In this way, as long as harmonic load current is generated by the use of a consumer special load, and distorted wave load current in a cycle different from that of any commercial frequency is passed through the transformer, in other words, passed through the LTC, the LTC is not allowed to operate. Once the current is in the cycle of a commercial frequency, the LTC can be operated, so that current interruption beyond the interrupting capability of the LTC can be prevented and short-circuiting between taps derived from an interruption failure can be prevented.

Second Embodiment

According to a second embodiment, as a method of controlling the changing operation of LTCs when transformers are operated in parallel, the shaft alignment position is adjusted so that the operation positions of the diverter switches of the LTCs are not in coincidence at the connecting positions of coupling shafts that mechanically couple the LTCs and motor operation mechanisms that drive the LTCs. In this way, transient current superposed with DC current in the diverter switch in each of the LTCs can be prevented from being interrupted.

Figure 8:
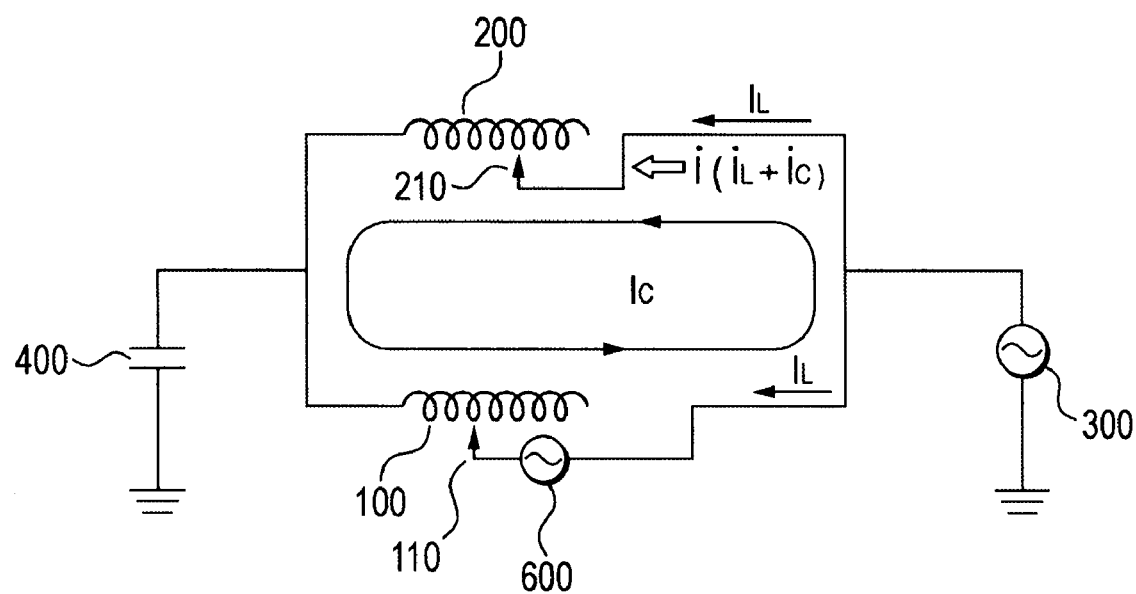
FIG. 8 is an equivalent circuit diagram of two LTC transformers operated in parallel.
Figure 9A:
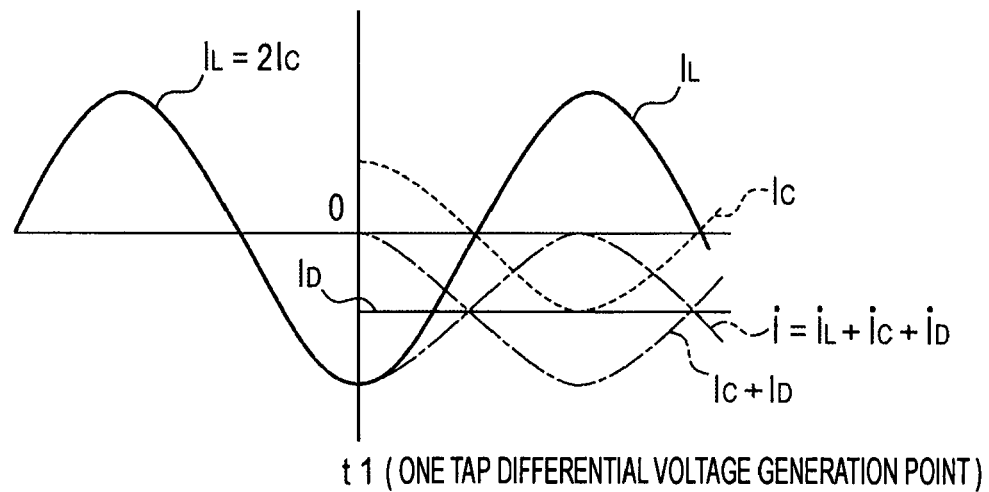
FIGS. 9A to 9C are waveform charts showing the waveforms of current in the equivalent circuit in FIG. 8.
Figure 9B:
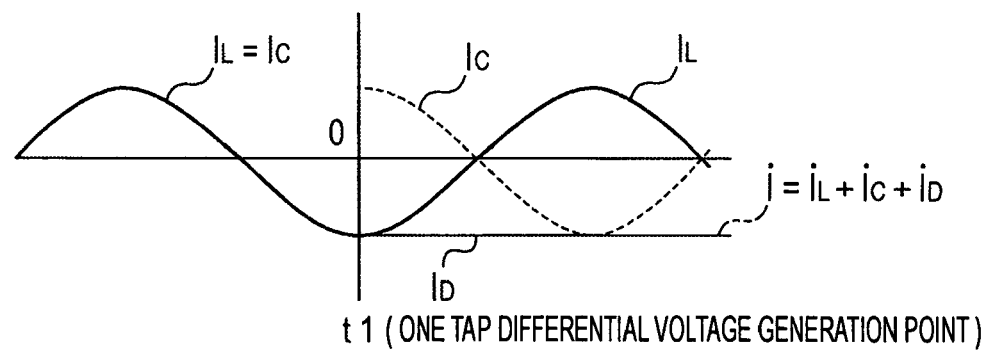
Figure 9C:
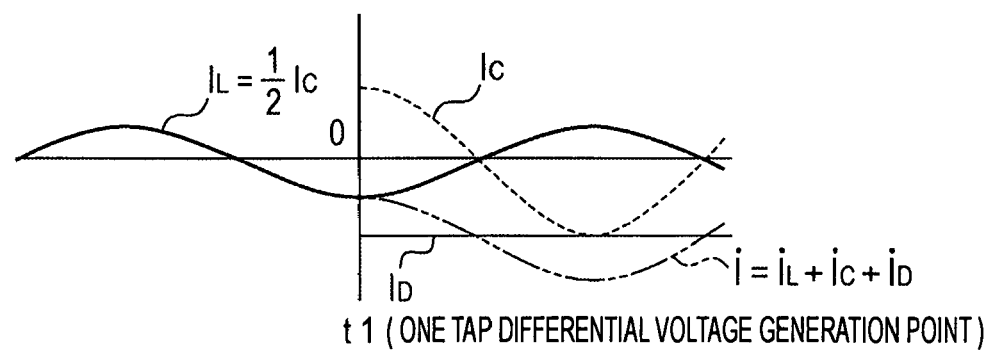

FIG. 8 is an equivalent circuit diagram of two LTC transformers operated in parallel, and FIGS. 9A to 9C show the waveforms of current in the equivalent circuit in FIG. 8.

In FIG. 8, 300 represents an AC power supply, 100 and 200 represent the LTC transformers operated in parallel, 110 represents an LTC operated prior to the other, 210 represents a succeeding LTC that operates delayed in time from the preceding LTC 110, and 400 represents a consumer load, which is a capacitor load in this example. The reference numeral 600 represents one tap differential voltage generated at the circuit based on the operation timing difference between the preceding LTC 110 and the succeeding LTC 210.

Circulating current passed between the transformers 100 and 200 operated in parallel by the one tap differential voltage 600 is represented by IC, IL represents load current supplied to the capacitor load 400 by the AC power supply 300, and I represents the total current obtained by adding the circulating current IC and the load current IL passed through the LTCs 110 and 210.

FIG. 9A shows the waveform of the composite current I= IL+IC+ID passed through the succeeding LTC 210 that is produced when DC current ID generated in the transient duration is superposed to the circulating current IC if the relation between the load current IL and the circulating current IC is represented by IL=2IC and one tap difference voltage 600 is generated at a phase of 270° of the load current (time t1). FIG. 9B shows the waveform of the composite current I passed through the succeeding LTC 210 in the above condition if the relation between the load current IL and the circulating current IC is represented by IL=IC. FIG. 9C shows the waveform of the composite current I passed through the succeeding LTC 210 in the conditions the same as those described above if the relation between the load current IL and the circulating current IC is represented by IL=½IC.

As can be seen from the above example, at a phase of 270° (or 90°) of the load current IL, in the timing in which the composite current of the circulating current IC including the transient DC current ID and the load current IL is passed through the succeeding LTC 210, the succeeding LTC 210 operates, so that the DC current with no current zero point is interrupted, and a lack of arc extinguishing capability could give rise to a serious accident such as short-circuits between tap windings of a transformer by the arc.

Figure 10:
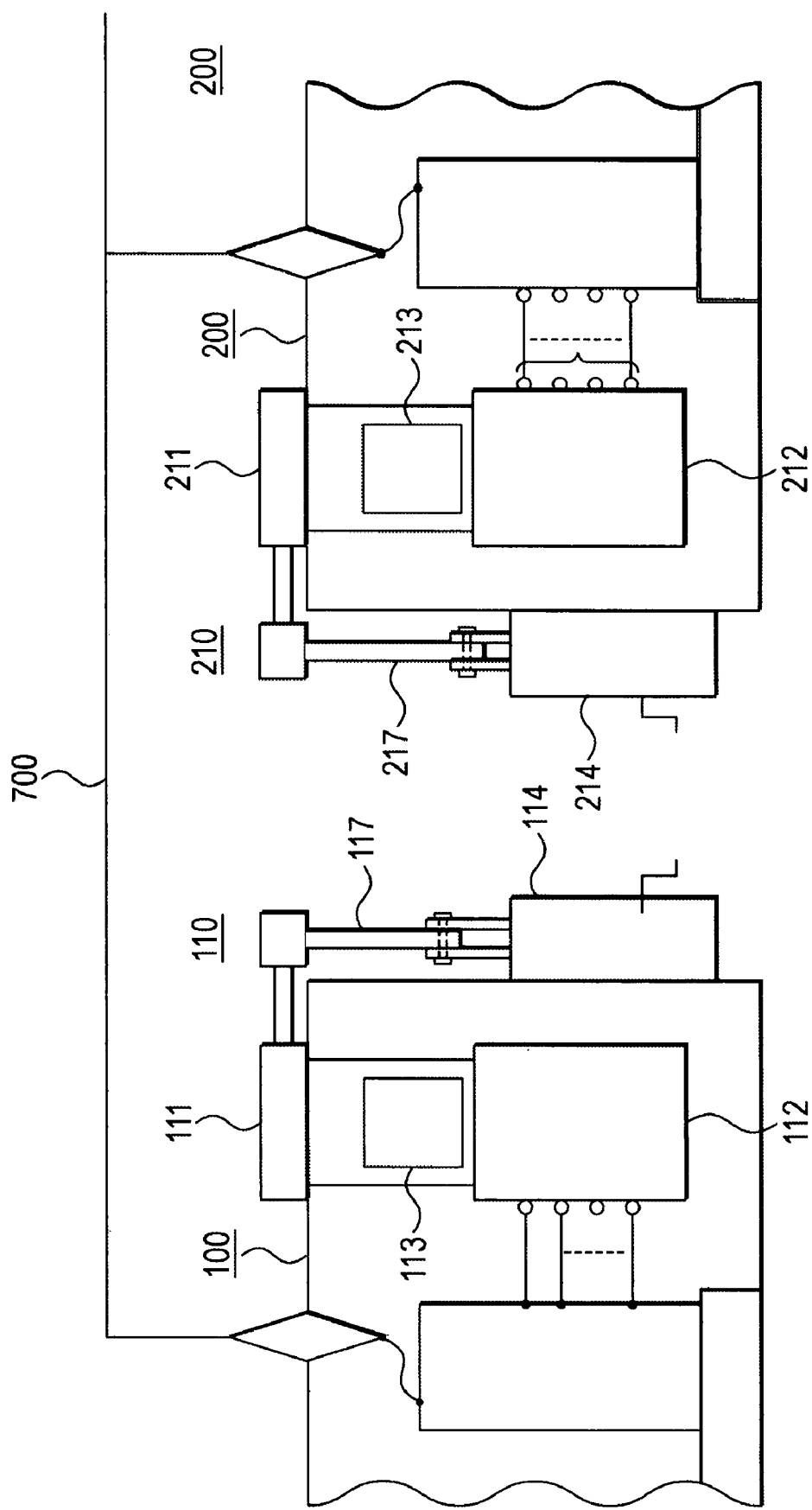
FIG. 10 is a diagram for use in illustrating a method of controlling tap changing operation according to a second embodiment of the invention when a plurality of LTC transformers are operated in parallel.

FIG. 10 is a diagram of a typical example of application of the method of controlling changing operation of LTCs in transformers operated in parallel according to the second embodiment of the invention directed to a solution to the problem to an arrangement of two transformers operated in parallel.

Figure 11:
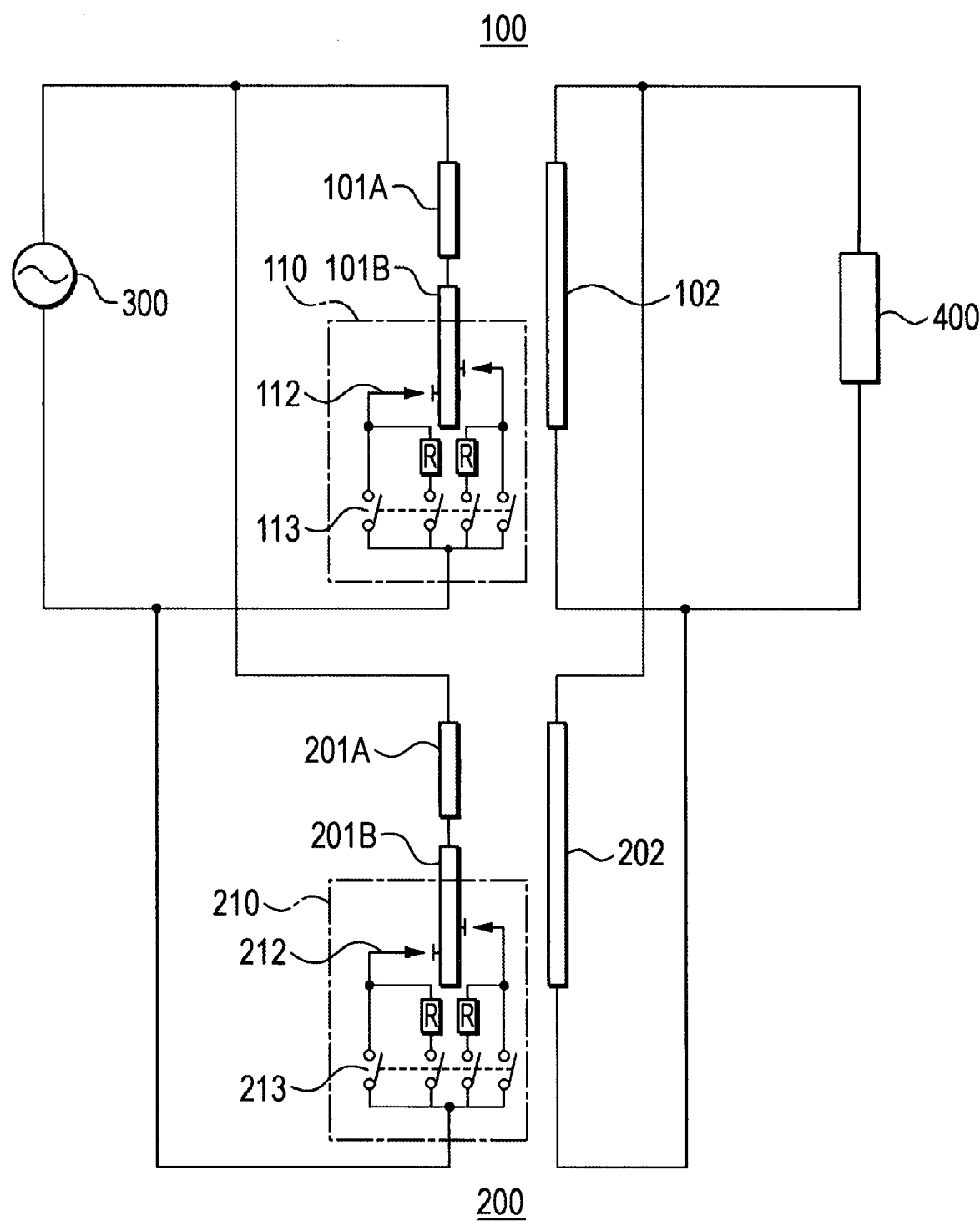
FIG. 11 is a circuit diagram showing the connection of the LTC transformers in a parallel operation state in the second embodiment in the form of a single-phase circuit.

In FIG. 10, 100 represents the first transformer, 200 represents the second transformer operated in parallel with the first transformer, and these transformers are connected with each other through a bus 700. More specifically, as shown in FIG. 11, the primary side main winding 101A and the primary side tap winding 101B of the first transformer 100 and the primary side main winding 201A and the primary side tap winding 201B of the second transformer 200 are connected in parallel, the secondary side winding 102 of the first transformer 100 and the secondary side winding 202 of the second transformer 200 are connected in parallel with each other.

The reference numeral 110 represents an LTC in the first transformer 100 and includes an LTC main body 111 including a tap selector 112 and a diverter switch 113, a driving motor operation mechanism 114, and a coupling shaft 117 that mechanically couples these elements. The reference numeral 210 represents an LTC in the second transformer and includes an LTC main body 211 including a tap selector 212 and a diverter switch 213, a driving motor operation mechanism 214, and a coupling shaft 217 that mechanically couples these elements. These elements have the same structures as those of the conventional ones.

In this construction, according to the method of controlling the changing operation of the LTCs in the transformers operated in parallel according to the second embodiment of the invention, the shaft alignment positions are shifted for connection so that the operation positions of the diverter switches 113 and 213 of the LTCs 110 and 210 are not at the same point at the connecting positions of the coupling shafts 117 and 217 that mechanically couple between the LTCs 110 and 210 and the motor operation mechanisms 114 and 214 that drives the LTCs. In this way, the operation positions of the diverter switches 113 and 213 can forcibly be shifted from each other.

Figure 12C:
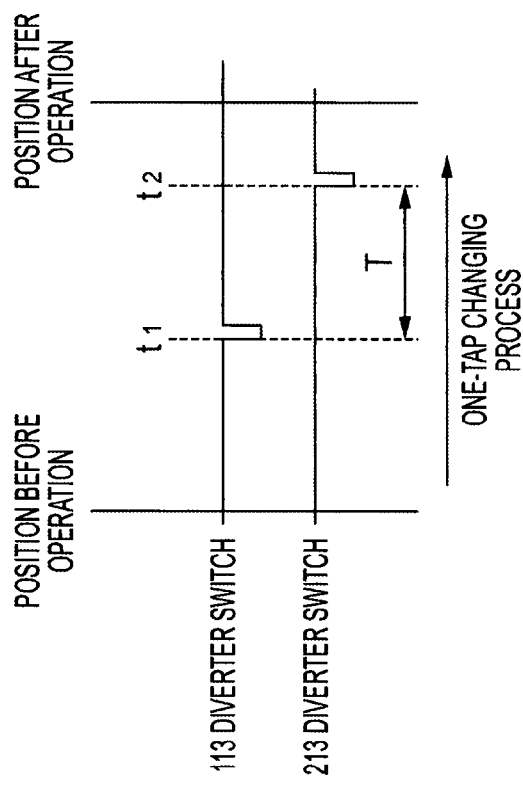
FIGS. 12A to 12D are charts for use in illustrating the process of one-tap changing operation by the LTCs in the transformers operated in parallel and the waveforms of current passed through the LTCs at the time according to the second embodiment.
Figure 12D:
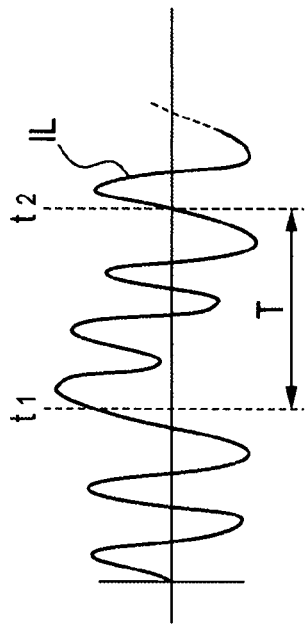
Figure 12A:
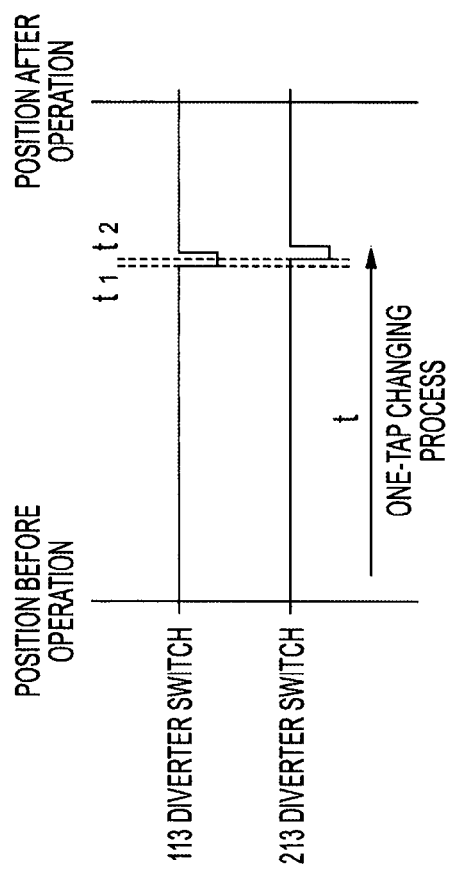
Figure 12B:
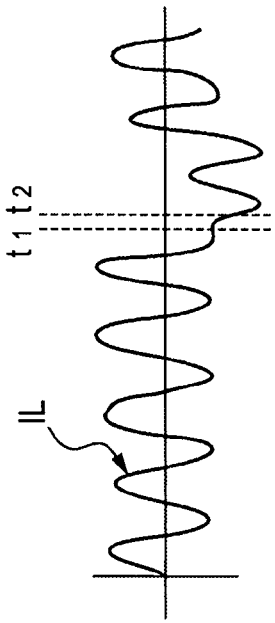

FIGS. 12A to 12D show the process of one-tap changing operation at each of the LTCs 110 and 210 before and after the operation positions of the diverter switches 113 and 213 are shifted, and the waveforms of the load current IL passed through the LTCs at the time. FIGS. 12A and 12B correspond to the waveforms before the shifting, and 12C and 12D correspond to the waveforms after the shifting.

Before the shifting, as shown in FIGS. 12A and 12B, the time difference between the operation points t1 and t2 of the diverter switches 113 and 213 is from several ms to several ten ms, and in this case, current with no current zero point must be interrupted with the diverter switch 213 of the succeeding LTC 210. Therefore, there is a high possibility of a failure in arc extinguishing. After the shifting, as shown in FIGS. 12C and 12D, the operation point t1 of the diverter switch 113 and the operation point t2 of the diverter switch 213 are kept from being the same, so that the DC current component (ID in FIG. 9) included in the current passed through the diverter switch 213 of the succeeding LTC 210 is completely attenuated. After a current zero point appears in the passed current, the diverter switch 213 is operated, and therefore the arc extinguishing can be prevented from being failed.

Figure 13:
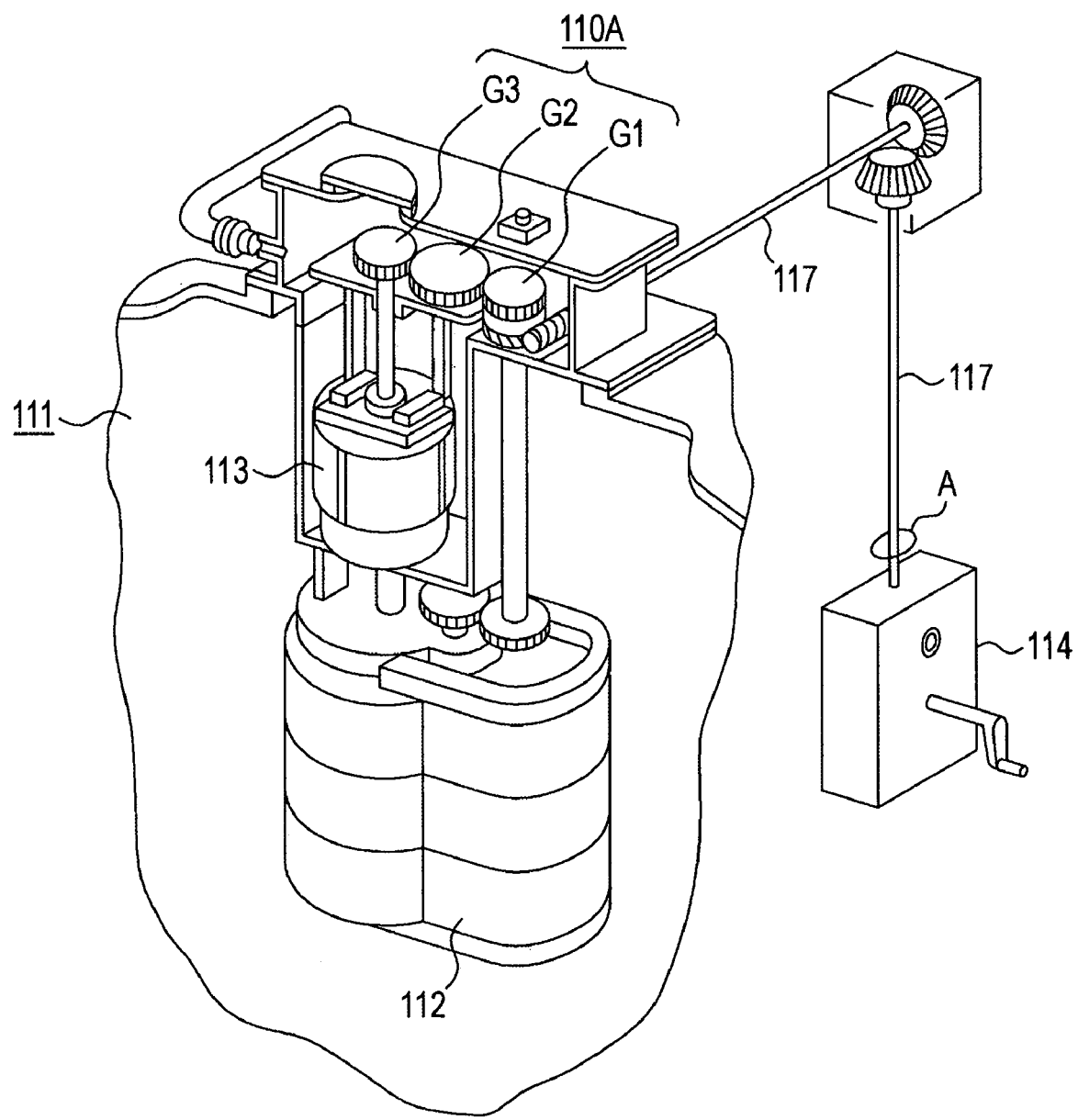
FIG. 13 is a perspective view showing the relation between the LTC main body and a driving motor operation mechanism 114 thereof.

FIG. 13 is a perspective view showing the relation between the LTC main body 111 in the LTC 110 and the driving motor operation mechanism 114 thereof.

As shown in FIG. 13, the LTC main body 111 is coupled with the motor operation mechanism 114 through the coupling shaft 117 and operates the tap selector 112 and the diverter switch 113 in association with each other through a gear mechanism 110A driven by the coupling shaft 117.

The gear mechanism 110A includes a first gear G1 coupled with a worm gear at the end of the coupling shaft 117 to drive the tap selector 112 and a third gear G3 coupled with the first gear through a second gear G2 to drive the diverter switch 113.

Figure 14:
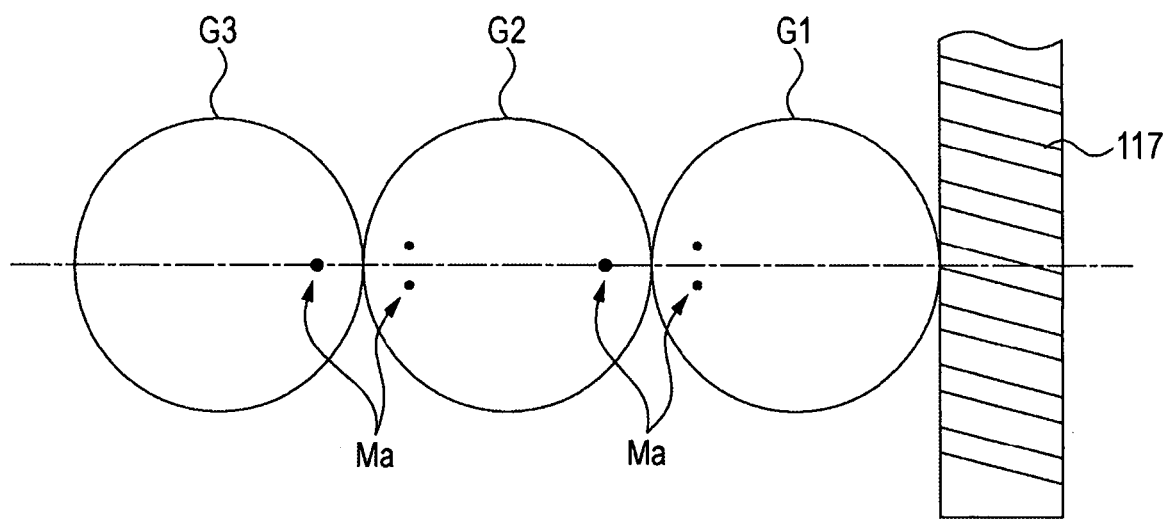
FIG. 14 is a view for use in illustrating the function of the gear mechanism of the LTC main body.

The gears G1, G2, and G3 are marked with alignment marks Ma as shown in FIG. 14, and the gears are arranged at the positions of the alignment marks, so that the tap selector 112 and the diverter switch 113 of the LTC main body 111 operate at prescribed operation points (operation points in the one-tap changing process).

Figure 15:
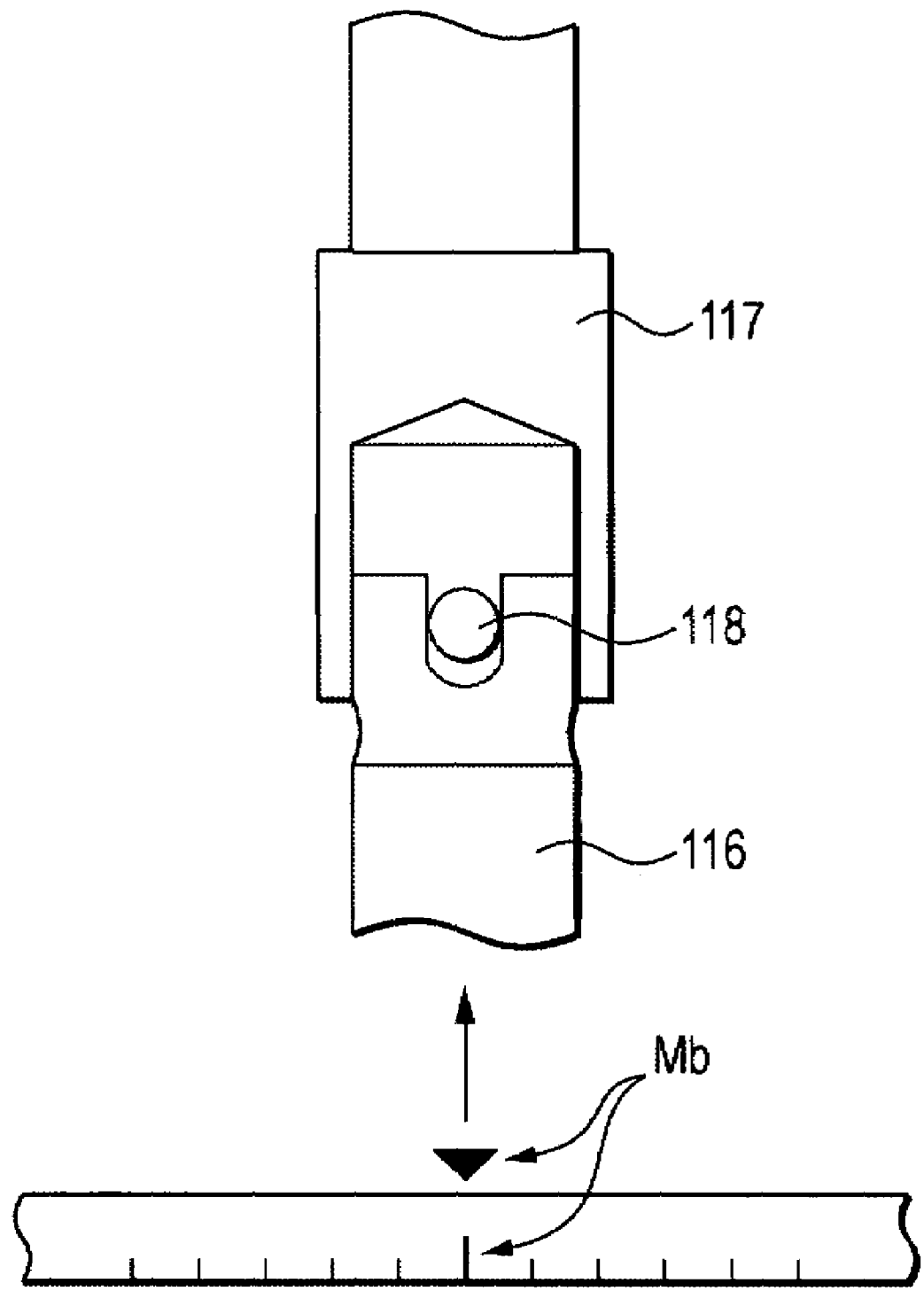
FIG. 15 is a view for use in illustrating the structure of the part coupling the LTC main body and the driving motor operation mechanism thereof.

FIG. 15 is a view for use in illustrating the structure of a part (part A in FIG. 13) that couples the LTC main body 111 and the driving motor operation mechanism 114 thereof, and as shown in FIG. 15, the output shaft 116 of the motor operation mechanism 114 and the coupling shaft 117 are coupled by inserting a coupling pin 118. The position of inserting the coupling pin 118 is determined with reference to the alignment mark Mb (on a protractor on a degree-basis used to monitor one-tap changing) indicated in the motor operation mechanism 114 so that the tap selector 112 and the diverter switch 113 of the LTC main body 111 operate at the prescribed operation points provided that the number of rotations of the output shaft 116 necessary for the tap changing process is for example 33 rotations.

Figure 16:
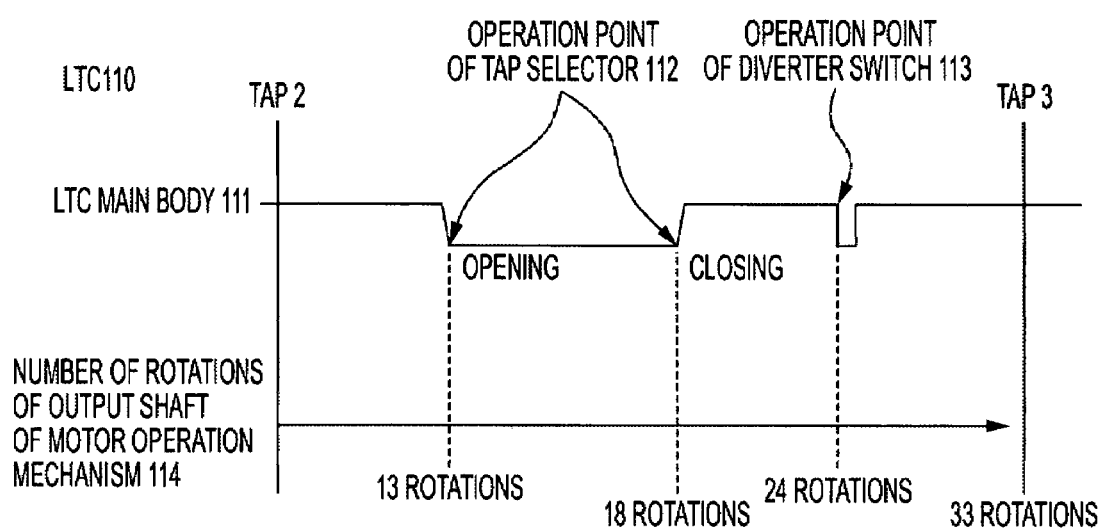
FIG. 16 is an example of a chart showing the operation of the LTC main body and one-tap changing operation by the motor operation mechanism.

For example, FIG. 16 is a chart showing an example of the operation of the LTC 110 and one-tap changing operation by the motor operation mechanism 114 after the adjustments shown in FIGS. 14 and 15.

FIG. 16 shows an example of the change from the tap 2 to the tap 3, in which the coupling pin 118 is positioned so that the number of rotations of the output shaft of the motor operation mechanism 114 and the operation point of the LTC main body 111 establish the relation shown in FIG. 16.

If the positioning is not successful, the coupling pin 118 is pulled out from the coupling shaft 117, and the shaft is turned in the direction in which only the number of rotations of the output shaft 116 of the motor operation mechanism 114 is raised or reduced (the rotational adjustment is made by manually operating the handle of the motor operation mechanism).

Thereafter, the coupling pin 118 is inserted again into the coupling shaft 117, adjustment is made so that the relation between the operation of the LTC main body 111 and the number of rotations of the output shaft 116 of the motor operation mechanism 114 is as shown in FIG. 16. Note however that the number of rotations is described simply as an example (the number of rotations may differ in practice depending on the type of the LTC).

Figure 17:
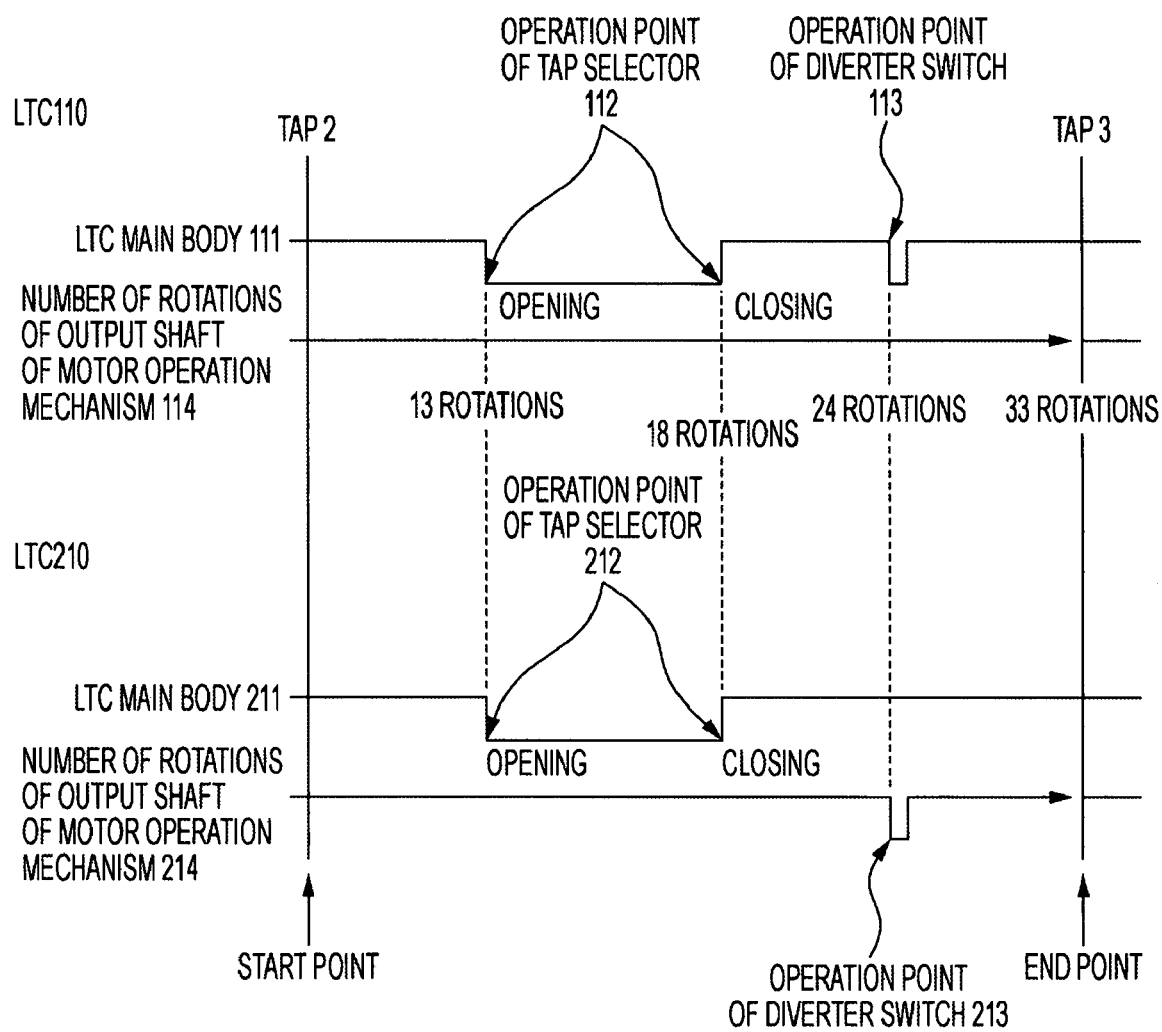
FIG. 17 is an example of a chart showing the operation of the LTC main bodies and the motor operation mechanisms when two transformers are operated in parallel.

In this example, an LTC is provided in one transformer, and FIG. 17 is an example of a chart showing the operation of LTCs and motor operation mechanisms when two transformers are operated in parallel.

When the LTC main body and the motor operation mechanism are coupled exactly in the same manner for the two LTCs 110 and 210, the operation points are the same as those of the LTCs 110 and 210 as shown in the timing chart in FIG. 17.

However, if the LTC main body and the motor operation mechanism are coupled in the same manner, slight difference in the operation timing is caused by a very small coupling variation between the two LTCs 110 and 210. The small operation timing difference causes the tap differential voltage described above.

According to the second embodiment, the operation position of the LTC 210 for example is shifted from that of the LTC 110, so that the operation points are not the same between the LTCs 110 and 210. More specifically, the position of inserting the coupling pin between the LTC main body 211 and the motor operation mechanism 214 is shifted from that of the combination with the LTC 110 by several rotations.

Figure 18:
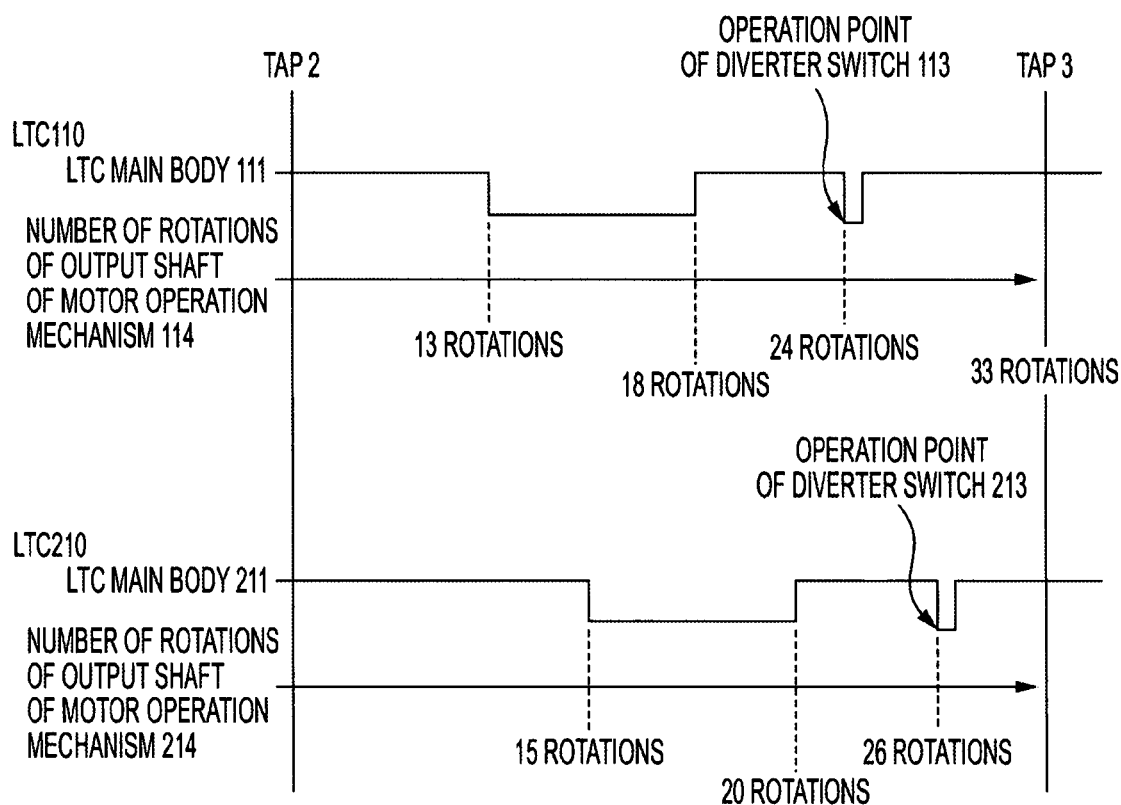
FIG. 18 is an example of a chart showing the operation of the LTC main bodies and the motor operation mechanisms after adjustment when two transformers are operated in parallel according to the second embodiment.

This is achieved by shifting the position of inserting the coupling pin 118 on the side of the LTC 210 so that the relation as shown in the timing chart in FIG. 18 is established.

As a specific example of adjustment, in the LTC 110, the coupling pin 118 is inserted in the position so that the operation position of the diverter switch 113 corresponds to 24 rotations of the output shaft, and in the LTC 210, the coupling pin 118 is inserted in the position so that the operation position of the diverter switch 213 corresponds to 26 rotations of the output shaft.

In the above example, the difference corresponds to two rotations, while the coupling pin 118 may be inserted with the difference of an arbitrary number of rotations, and the operation positions of the diverter switches 113 and 213 can arbitrarily be set.

According to the second embodiment, by the method of controlling the changing operation of LTCs provided in a plurality of transformers operated in parallel by carrying out the tap changing operation of the LTCs that are mechanically driven through the coupling shafts by the motor operation mechanisms in association with one another, the coupling positions between the motor operation mechanisms of the LTCs and the coupling shafts are sequentially shifted so that the positions of changing operation of the LTCs are not in coincidence or in vicinity. Therefore, when a plurality of LTC transformers are operated in parallel, after the DC current in transient circulating current caused by one tap differential voltage is completely attenuated, the LTCs are sequentially operated, so that arc can surely be extinguished at the position of a current zero point of a commercial frequency and short circuiting between taps caused by a failure of interrupting current beyond the interrupting capability of the diverter switch of the LTC can be prevented.

Third Embodiment

According to the method of controlling the changing operation according to the second embodiment described above, the coupling positions of the output shafts of the motor operation mechanisms and the LTC main bodies are shifted so that the operation positions of the plurality of LTCs are not in coincidence. As will be described, according to a third embodiment, the same function is achieved by changing the point to start the motor operation of a plurality of motor operation mechanisms.

Figure 19:
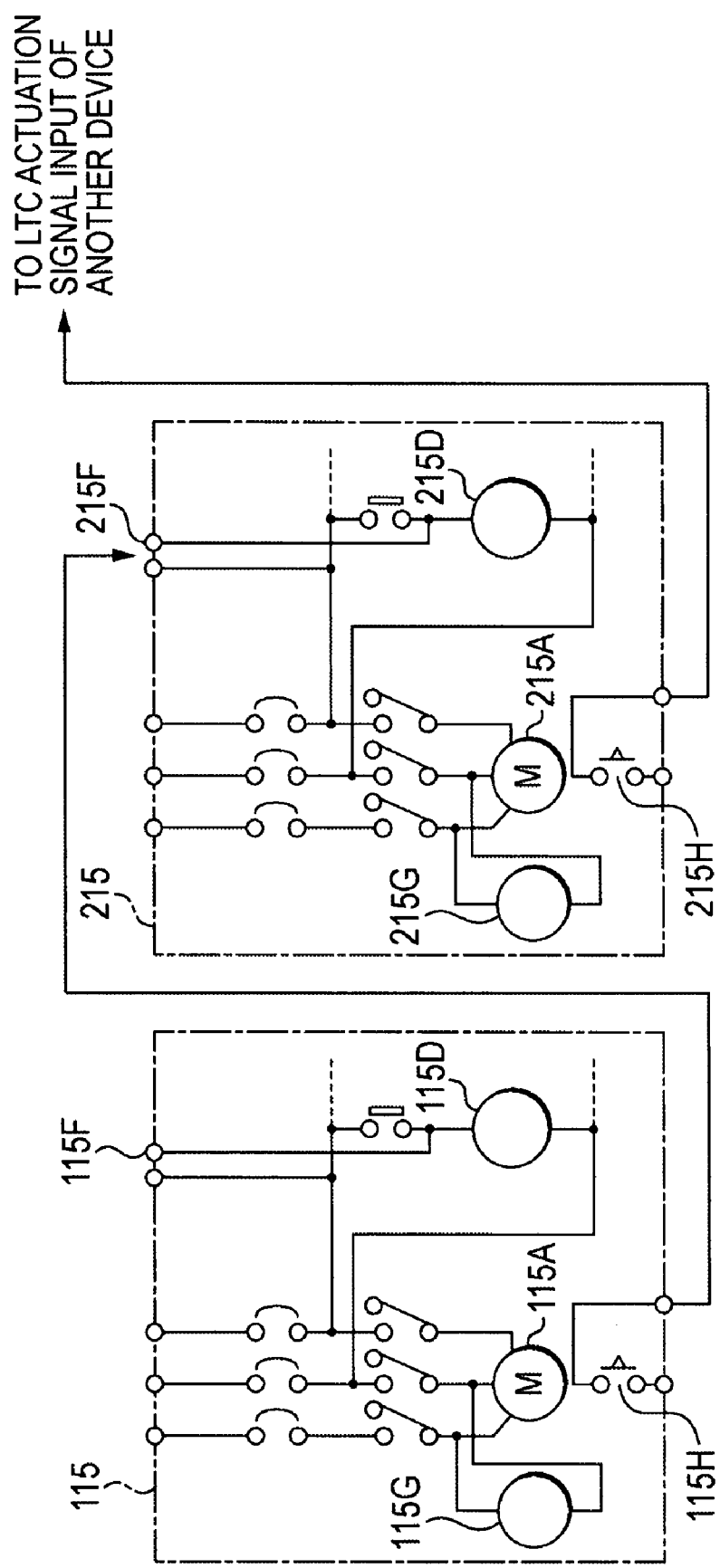
FIG. 19 is a diagram of a motor circuit that drives a motor operation mechanism according to a third embodiment of the invention.

FIG. 19 is a diagram of the configuration of motor circuits that drives motor operation mechanisms according to the third embodiment. In a motor circuit 115 that drives the motor operation mechanism of an LTC 110 and a motor circuit 215 that drives the motor operation mechanism of an LTC 210 operated in association with the LTC 110, timers 115G and 215G are connected to the input power supplies of the motor circuits 115 and 215, respectively, the timing contacts 115H and 215H of the timers 115G and 215G are connected to the actuation signal input terminal of the motor circuit of the motor operation mechanism on the side of the LTC that delays the starting point of the motor operation (the actuation signal input terminal 215F of the motor circuit 215 of the LTC 210 in this example).

Figure 20:
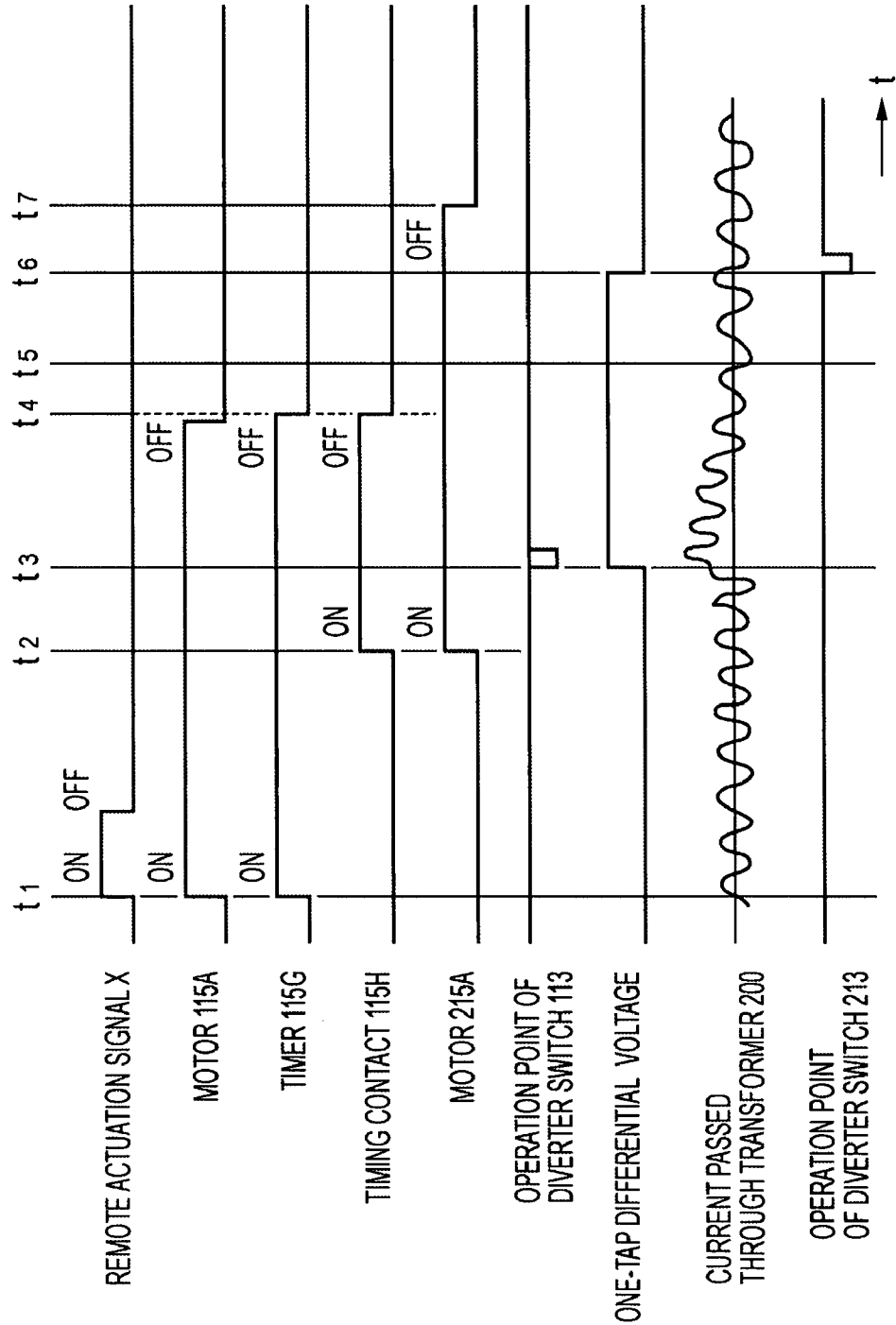
FIG. 20 is a timing chart for use in illustrating the operation of the circuit in FIG. 19.

In FIG. 19, when the actuation signal input terminal 115F of the motor circuit 115 that drives the motor operation mechanism of the LTC 110 is provided with a remote actuation signal X at time t1 as shown in the timing chart in FIG. 20, the motor 115A of the motor circuit 115 in the motor operation mechanism 114 of the LTC 110 is activated in the timing t1, the operation of the LTC 110 and the excitation of the timer 115G start simultaneously with the motor activation, the timer expires in the timing t2 after the timer setting time, and its signal is input to the motor operation mechanism 214 of the LTC 210 as an actuation signal. In response to the input of actuation signal, the motor 215A of the motor operation mechanism 214 is activated and the changing operation of the LTC 210 is started.

Meanwhile, the diverter switch 113 of the preceding LTC 110 operates in the timing t3 and makes a connection to the next tap side. Simultaneously with the end of the changing operation, voltage for one tap difference is generated between the transformers operated in parallel, transient current including a DC component is passed between the transformers because of the differential voltage, and the DC current is then attenuated with a time constant according to the circuit constant and converged to steady-state current in the timing t5. Thereafter, the diverter switch 213 of the succeeding tap changer 210 operates in the timing t6, normally interrupts the current converged to the steady-state current, and makes a connection to the next tap side.

After the operation of the diverter switches 113 and 213 both ends, the motor operation mechanisms 114 and 214 both stop in the timing of the normal stop positions t4 and t7, respectively, so that the process of one-tap changing operation is entirely complete.

In this way, the motor operation mechanism 214 of the succeeding LTC 210 can be delayed in operation at arbitrary time set from the start of the operation of the motor operation mechanism 114 of the preceding LTC 110.

Note that instead of the timers 115G and 215G provided in the motor circuits 115 and 215, a circuit or a timer that delays an actuation signal may be provided in a remote control board that controls the operation of the LTCs, so that an actuation signal is input in different timing for the motor operation mechanisms for the LTCs, the operation start points of the motor operation mechanisms are changed among one another, and the operation points of the diverter switches of the LTCs are not in coincidence.

As in the foregoing, according to the third embodiment, in the method of controlling the changing operation of LTCs provided in a plurality of transformers operated in parallel by carrying out the tap changing operation of the LTCs driven by the motor operation mechanisms in association with one another, the motor operation mechanism for the preceding LTC is operated and then after a prescribed period, actuation signals are sequentially transmitted to the motor operation mechanisms for the succeeding LTCs to sequentially delay the operation of the motor operation mechanisms of the succeeding LTCs, so that the changing operation points of the LTCs are not in coincidence or in vicinity. Therefore, after transient circulating current superposed with DC current generated by one-tap differential voltage caused by operating the preceding LTC is completely attenuated, the succeeding LTCs may sequentially be operated, and therefore current arc can surely be extinguished at the position of a current zero point of a commercial frequency, so that short-circuiting between taps derived from a failure of interrupting current beyond the interrupting capability of the diverter switch of the LTC can be prevented.

Fourth Embodiment

A fourth embodiment is another example of the method of controlling the changing operation of an LTC applied to a plurality of LTC transformers operated in parallel.

Figure 21:
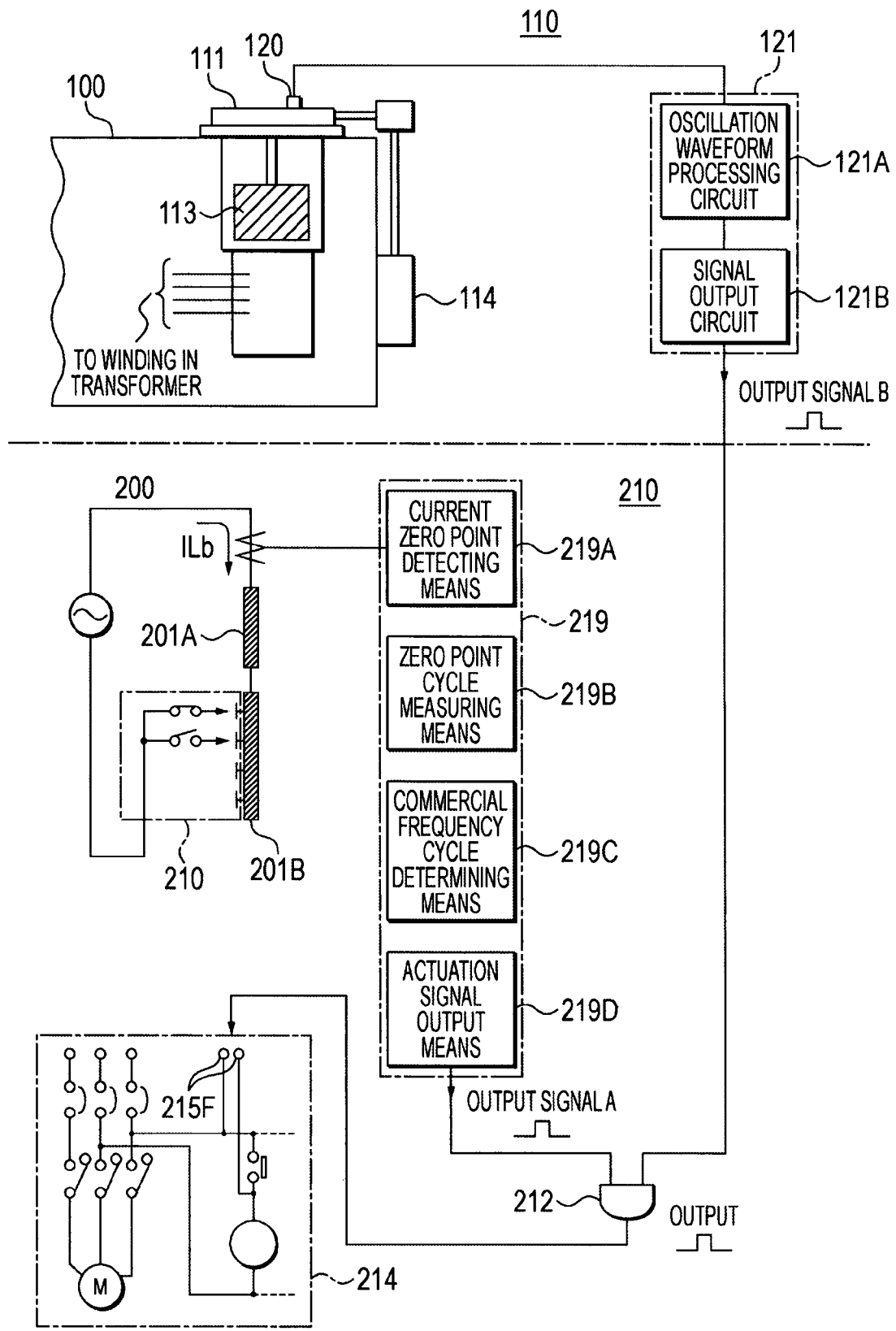
FIG. 21 is a diagram for use in illustrating the method of tap changing operation when LTC transformers are operated in parallel in a fourth embodiment of the invention.

FIG. 21 is a diagram of a specific configuration of an LTC according to the fourth embodiment. For example, on the side of the LTC 110 of the transformer 100, there are an oscillation sensor 120 detects the operation of the diverter switch 113 and an operation detector 121 including an oscillation waveform processing circuit 121A that processes the oscillation waveform of the oscillation sensor and a signal output circuit 121B, and its output signal B is transmitted to the side of the LTC 210 of the transformer 200. On the side of the LTC 210 of the transformer 200, there is an AND circuit 212 that outputs a logical product of the output signal A of its own changing operation controller 219 and the transmitted output signal B of the operation detector 121, and the output of the circuit is an actuation signal for the motor operation mechanism 214 on the side of the LTC 210.

In this example, the oscillation sensor 120 is provided at the head of the LTC main body 111 and detects the operation of the diverter switch 113 based on mechanical oscillation caused by the operation of the diverter switch 113 of the LTC main body 111.

Figure 22:
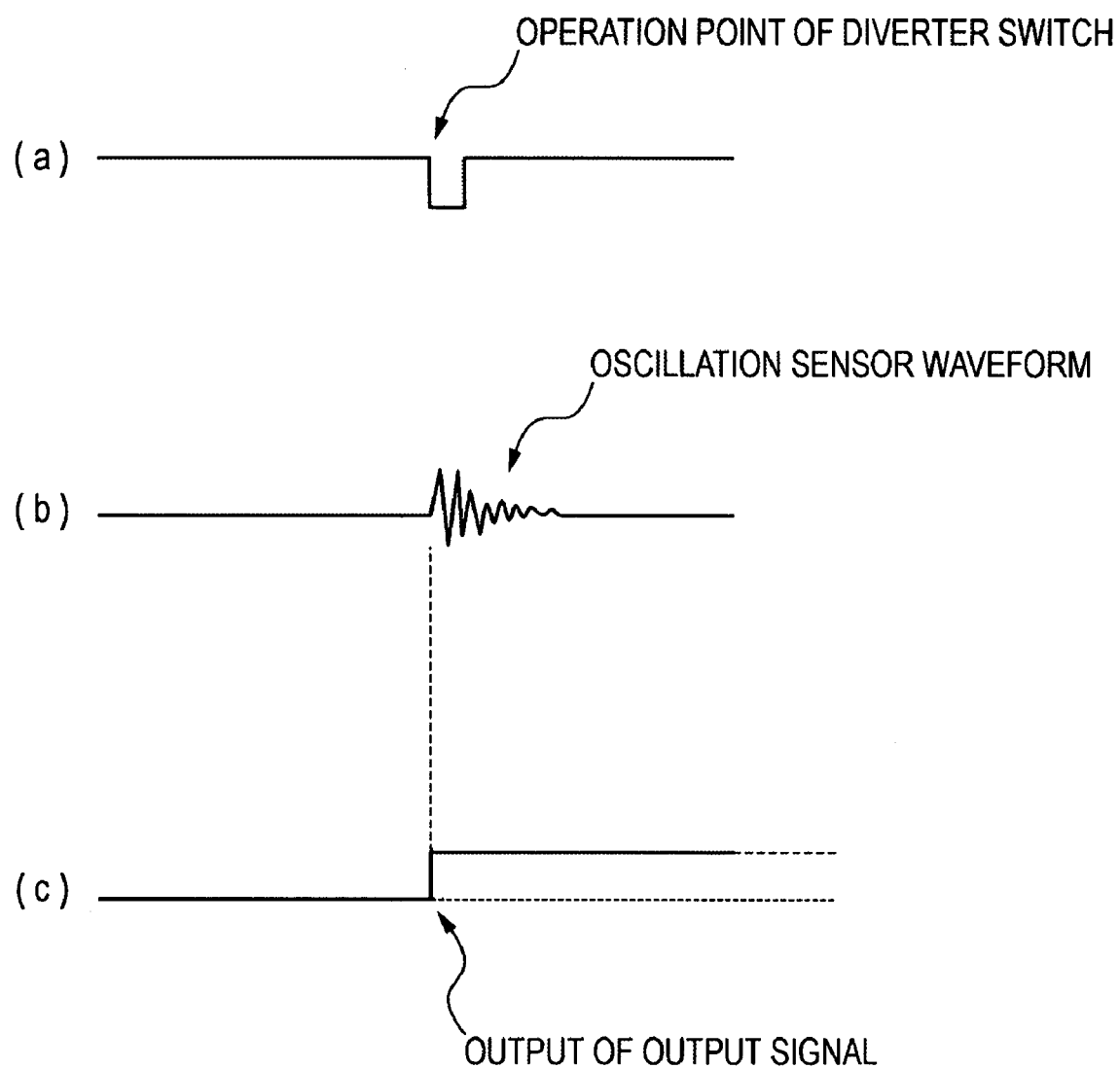
FIG. 22 is charts for use in illustrating the operation of an oscillation sensor and an operation detector in the fourth embodiment.

FIG. 22 is charts for use in illustrating the operation of the oscillation sensor 120 and the operation detector 121. In FIG. 22, (a) shows a signal waveform corresponding to the operation of the diverter switch 113, (b) shows a signal waveform corresponding to the oscillation sensor 120, and (c) shows a signal waveform corresponding to the operation detector 121.

The changing operation controller 219 has the same structure and function as those of the changing operation controller 119 as shown in FIG. 6 and includes a current zero point detecting unit 219A, a zero point cycle measuring unit 219B, a commercial frequency cycle determining unit 219C, and an actuation signal output unit 219D.

Figure 23:
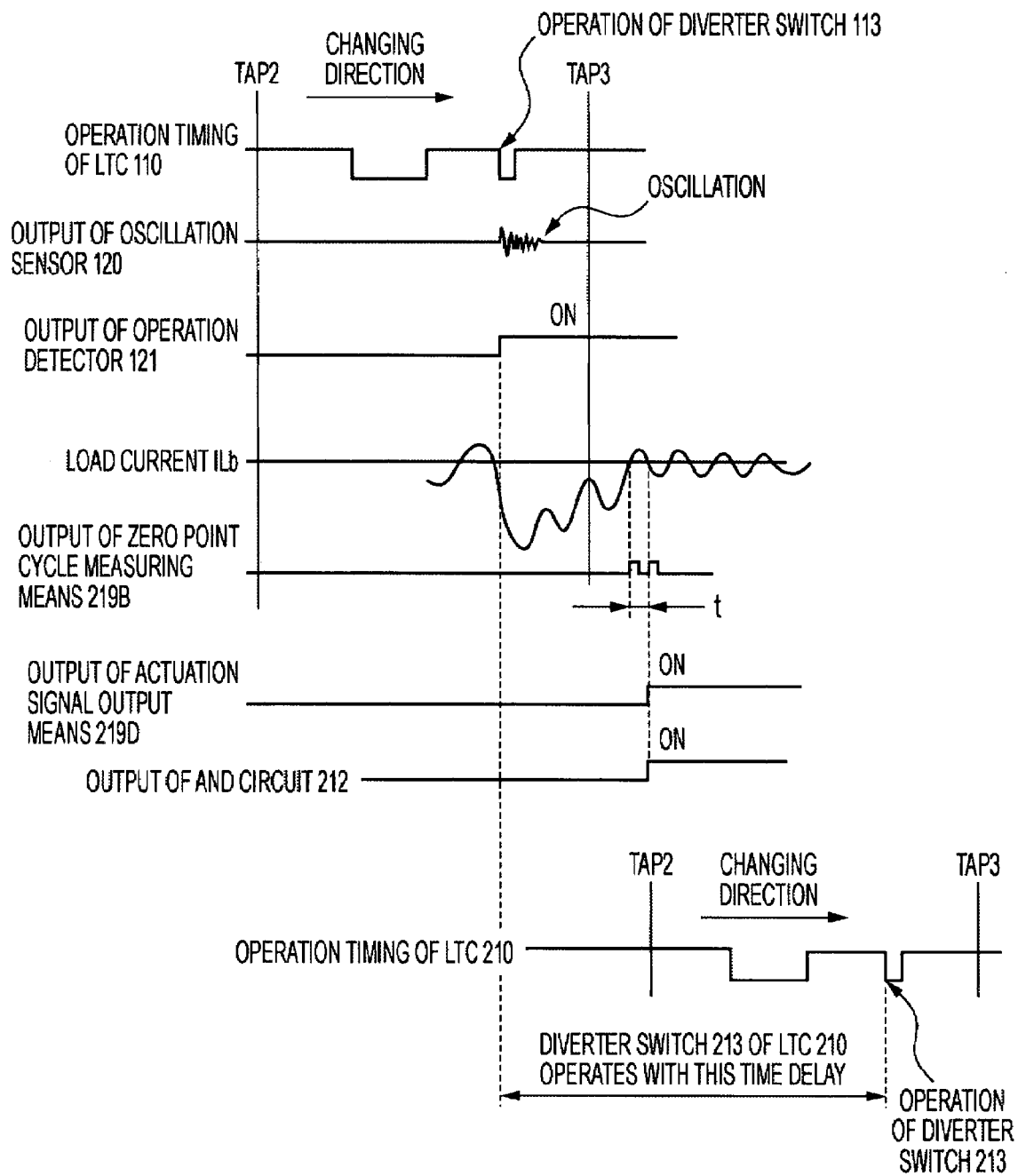
FIG. 23 is a timing chart for use in illustrating the tap changing operation according to the fourth embodiment.

The operation of the fourth embodiment described above will be described with reference to FIG. 23.

(1) The preceding LTC 110 is electrically operated by the motor operation mechanism 114.

At the time, the motor operation mechanism 214 at the side of the succeeding LTC 210 is in a stationary state (since an actuation command signal is applied only to the motor operation mechanism 114 on the side of the LTC 110).

(2) A diverter switch 113 operates during the changing operation of the LTC 110. Mechanical oscillation made at the time is detected by the oscillation sensor 120 and an output signal B is output from the signal output circuit 121B of the operation detector 121 and input to one input terminal of the AND circuit 212.

(3) A current zero point of load current ILb passed through the succeeding LTC 210 is detected by the changing operation controller 219, its cycle is measured, and an output signal A is turned on only if the measured cycle is in coincidence with that of a commercial frequency of 50 Hz or 60 Hz set beforehand and input to the other input terminal of the AND circuit 122.

(4) If the "on" conditions in the above (2) and (3) for both signals A and B are satisfied, the output signal of the AND circuit 122 is transmitted as an on signal.

(5) The "on" output signal of the AND circuit 212 is input to the actuation signal input terminal 215F of the succeeding motor operation mechanism 214, and the succeeding motor operation mechanism 214 is electrically operated, so that the LTC 210 carries out one-tap changing operation.

Note that when a plurality of additional LTCs are controlled as well, the succeeding LTCs 210 are provided both with an oscillation sensor and a changing operation controller as with the LTC 110, so that the operation timing of the motor operation mechanisms of the LTCs can be controlled in the same manner.

As in the foregoing, according to the fourth embodiment, in the method of controlling the changing operation of LTCs provided in a plurality of transformers operated in parallel by carrying out the tap changing operation of the LTCs driven by the motor operation mechanisms in association with one another, the preceding LTC transmits the output signal of the oscillation sensor that detects the execution of the changing operation to the succeeding LTC, and the succeeding LTC carries out changing operation based on a logical product of an actuation signal used to cause the changing operation of itself and the output signal of the oscillation sensor. Therefore, after transient circulating current superposed with DC current generated by one-tap differential voltage caused by operating the preceding LTC is completely attenuated, the succeeding LTCs are sequentially operated, and therefore current arc can surely be extinguished at the position of a current zero point of a commercial frequency, so that short circuiting between taps caused by a failure of interrupting current beyond the interrupting capability of the diverter switch of the LTC can be prevented.

Various modifications and alternations of this invention will be apparent to those skilled in the art without departing from the scope and spirit of this invention, and it should be understood that this is not limited to the illustrative embodiments set forth herein.

What is claimed is:

1. A changing operation control method for an on-load tap changer by carrying out the tap changing operation of on-load tap changers provided in a plurality of transformers operated in parallel and driven by motor operation mechanisms through coupling shafts in association with one another, wherein the coupling positions of the motor operation mechanisms of the on-load tap changers and the coupling shafts are sequentially shifted so that the changing operation positions of the on-load tap changers are neither in coincidence nor in vicinity.

2. A changing operation control method for an on-load tap changer by carrying out the tap changing operation of on-load tap changers provided in a plurality of transformers operated in parallel and driven by motor operation mechanisms in association with one another, the method comprising, after operating the motor operation mechanism of a preceding on-load tap changer, the step of sequentially transmitting an actuation signal to the motor operation mechanism of a succeeding on-load changer after a prescribed period, thereby sequentially delaying the operation of the motor operation mechanism of the succeeding on-load tap changer so that the changing operation points of the on-load tap changers are neither in coincidence nor in vicinity.

3. A changing operation control method for an on-load tap changer by carrying out the tap changing operation of on-load tap changers provided in a plurality of transformers operated in parallel and driven by motor operation mechanisms in association with one another, wherein a preceding on-load tap changer transmits the output signal of an oscillation sensor that detects the execution of its changing operation to a succeeding on-load tap changer, and the succeeding on-load tap changer carries out changing operation based on a logical product of an actuation signal used to carry out its own changing operation and the output signal of the oscillation sensor.

4. The changing operation control method for an on-load tap changer according to claim 3, wherein the succeeding on-load tap changer detects a zero point in the waveform of current passed therethrough, measures the cycle of the detected current zero point, and outputs an actuation signal used to have the on-load tap changer carry out tap changing operation if the cycle of the measured current zero point corresponds to a commercial frequency.

* * * * *